US012666292B2

(12) United States Patent
Matsumura et al.

(10) Patent No.: US 12,666,292 B2
(45) Date of Patent: Jun. 23, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 373 days.

(21) Appl. No.: 18/263,428

(22) PCT Filed: Jan. 24, 2022

(86) PCT No.: PCT/JP2022/002336
§ 371 (c)(1),
(2) Date: Jul. 28, 2023

(87) PCT Pub. No.: WO2022/163558
PCT Pub. Date: Aug. 4, 2022

(65) Prior Publication Data
US 2024/0107354 A1      Mar. 28, 2024

(30) Foreign Application Priority Data

Jan. 29, 2021    (JP) ................................. 2021-013278

(51) Int. Cl.
*H04W 24/10*        (2009.01)
*H04B 7/06*         (2006.01)
*H04L 5/00*         (2006.01)

(52) U.S. Cl.
CPC .......... *H04W 24/10* (2013.01); *H04B 7/0626* (2013.01); *H04L 5/0035* (2013.01)

(58) Field of Classification Search
CPC ..... H04W 24/10; H04W 16/28; H04W 72/04; H04B 7/0626; H04B 7/0695; H04B 7/06; H04L 5/0035
See application file for complete search history.

(56) References Cited

U.S. PATENT DOCUMENTS

2020/0128547 A1 * 4/2020 Shi ...................... H04B 7/0626

FOREIGN PATENT DOCUMENTS

CN          116134742 A  *  5/2023    ......... H04B 7/06966

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).

(Continued)

*Primary Examiner* — Chuong A Ngo
(74) *Attorney, Agent, or Firm* — Osha Bergman Watanabe & Burton LLP

(57) ABSTRACT

To appropriately perform CSI measurement and reporting for multi-panel/TRP. A terminal according to one aspect of the present disclosure includes a receiving section that receives configuration information related to a plurality of pairs of channel measurement resources, and a control section that controls, on the basis of the configuration information, group-based beam reporting or channel state information reporting for a plurality of transmission/reception points.

5 Claims, 37 Drawing Sheets

(56) References Cited

OTHER PUBLICATIONS

NTT Docomo, Inc.; "Discussion on CSI enhancements"; 3GPP TSG RAN WG1 #104-e, R1-2101603; e-Meeting, Jan. 25-Feb. 5, 2021 (16 pages).

Huawei et al.; "CR on maintaining L1-SINR measurement requirements Rel-16"; 3GPP TSG-RAN WG4 Meeting #98-e, R4-2101671; Online, Jan. 25-Feb. 5, 2021 (5 pages).

International Search Report issued in PCT/JP2022/002336 on Apr. 19, 2022 (3 pages).

Written Opinion of the International Searching Authority issued in PCT/JP2022/002336 on Apr. 19, 2022 (4 pages).

* cited by examiner

```
CSI-ReportConfig ::=          SEQUENCE {
    reportConfigId               CSI-ReportConfigId,
    carrier                      ServCellIndex                 OPTIONAL,    -- Need S
    resourcesForChannelMeasurement    CSI-ResourceConfigId,
    csi-IM-ResourcesForInterference   CSI-ResourceConfigId          OPTIONAL,    -- Need R
    nzp-CSI-RS-ResourcesForInterference  CSI-ResourceConfigId       OPTIONAL,    -- Need R
    reportConfigType             CHOICE {
        periodic                 SEQUENCE {
            reportSlotConfig         CSI-ReportPeriodicityAndOffset,
            pucch-CSI-ResourceList   SEQUENCE (SIZE (1..maxNrofBWPs)) OF PUCCH-CSI-Resource
        },
        semiPersistentOnPUCCH    SEQUENCE {
            reportSlotConfig         CSI-ReportPeriodicityAndOffset,
            pucch-CSI-ResourceList   SEQUENCE (SIZE (1..maxNrofBWPs)) OF PUCCH-CSI-Resource
        },
        semiPersistentOnPUSCH    SEQUENCE {
            reportSlotConfig         ENUMERATED {sl5, sl10, sl20, sl40, sl80, sl160, sl320},
            reportSlotOffsetList     SEQUENCE (SIZE (1.. maxNrofUL-Allocations)) OF INTEGER(0..32),
            p0alpha                  P0-PUSCH-AlphaSetId
        },
        aperiodic                SEQUENCE {
            reportSlotOffsetList     SEQUENCE (SIZE (1..maxNrofUL-Allocations)) OF INTEGER(0..32)
        }
    },
    reportQuantity              CHOICE {
        none                     NULL,
        cri-RI-PMI-CQI           NULL,
        cri-RI-il                NULL,
        cri-RI-il-CQI            NULL,
        pdsch-BundleSizeForCSI   SEQUENCE {
                                     ENUMERATED {n2, n4}
                                 }
    }
OPTIONAL      -- Need S
    },
    cri-RI-CQI               NULL,
    cri-RSRP                 NULL,
    ssb-Index-RSRP           NULL,
    cri-RI-LI-PMI-CQI        NULL
};
.....
;
```

FIG. 1

| 4 CSI pair (N=4) | CMR#0, CMR#4 | CMR#1, CMR#5 | CMR#2, CMR#6 | CMR#3, CMR#7 |
|---|---|---|---|---|
| ZP- IMR (for 2 CSIs in a pair) | #a | #b | #c | #d |
| NZP- IMR | WHEN NEW PARAMETER IS CONFIGURED, CMR FROM TRP 2 (TRP 1) IS ASSUMED AS NZP INTERFERENCE BY CSI WITH CMR FROM TRP 1 (TRP 2). | | | |

FIG. 5

| 16 CSI pair (N=4) | CMR#0, CMR#4 | CMR#0, CMR#5 | CMR#0, CMR#6 | CMR#0, CMR#7 | ... | CMR#3, CMR#4 | CMR#3, CMR#5 | CMR#3, CMR#6 | CMR#3, CMR#7 |
|---|---|---|---|---|---|---|---|---|---|
| ZP- IMR (for 2 CSIs in a pair) | #a | #a | #a | #a | ... | #d | #d | #d | #d |
| NZP- IMR | WHEN NEW PARAMETER IS CONFIGURED, CMR FROM TRP 2 (TRP 1) IS ASSUMED AS NZP INTERFERENCE BY CSI WITH CMR FROM TRP 1 (TRP 2). | | | | | | | | |

FIG. 7

| 4 CSI pair (N=4) | CMR#0, CMR#4 | CMR#1, CMR#5 | CMR#2, CMR#6 | CMR#3, CMR#7 |
|---|---|---|---|---|
| ZP- IMR | #a for CMR#0, #e for CMR#4 | #b for CMR#1, #f for CMR#5 | #c for CMR#2, #g for CMR#6 | #d for CMR#3, #h for CMR#7 |
| NZP- IMR | WHEN NEW PARAMETER IS CONFIGURED, CMR FROM TRP 2 (TRP 1) IS ASSUMED AS NZP INTERFERENCE BY CSI WITH CMR FROM TRP 1 (TRP 2). | | | |

FIG. 9

| 16 CSI pair (N=4) | CMR#0, CMR#4 | CMR#0, CMR#5 | CMR#0, CMR#6 | CMR#0, CMR#7 | ... | CMR#3, CMR#4 | CMR#3, CMR#5 | CMR#3, CMR#6 | CMR#3, CMR#7 |
|---|---|---|---|---|---|---|---|---|---|
| ZP-IMR | #a for CMR#0, #e for CMR#4 | #a for CMR#0, #f for CMR#5 | #a for CMR#0, #g for CMR#6 | #a for CMR#0, #h for CMR#7 | ... | #d for CMR#3, #e for CMR#4 | #d for CMR#3, #f for CMR#5 | #d for CMR#3, #g for CMR#6 | #d for CMR#3, #h for CMR#7 |
| NZP-IMR | WHEN NEW PARAMETER IS CONFIGURED, CMR FROM TRP 1 (TRP 2) IS ASSUMED AS NZP INTERFERENCE BY CSI WITH CMR FROM TRP 1 (TRP 2). | | | | | | | | |

FIG. 11

| 4 CSI pair (N=4) | CMR#0, CMR#4 | CMR#1, CMR#5 | CMR#2, CMR#6 | CMR#3, CMR#7 |
|---|---|---|---|---|
| ZP- IMR | #a | #b | #c | #d |
| NZP- IMR | #A | #B | #C | #D |
| NZP- IMR by CMR | VARY DEPENDING ON ASPECT 1/2/3 | | | |

FIG. 13

| 16 CSI pair (N=4) | CMR#0, CMR#4 | CMR#0, CMR#5 | CMR#0, CMR#6 | CMR#0, CMR#7 | ... | CMR#3, CMR#4 | CMR#3, CMR#5 | CMR#3, CMR#6 | CMR#3, CMR#7 |
|---|---|---|---|---|---|---|---|---|---|
| ZP-IMR | #a | #a | #a | #a | ... | #d | #d | #d | #d |
| NZP-IMR | #A | #A | #A | #A | | #D | #D | #D | #D |
| NZP-IMR by CMR | VARY DEPENDING ON ASPECT 1/2/3 | | | | | | | | |

FIG. 15

| 4 CSI pair (N=4) | CMR#0, CMR#4 | CMR#1, CMR#5 | CMR#2, CMR#6 | CMR#3, CMR#7 |
|---|---|---|---|---|
| ZP-IMR | #a for CMR#0, #e for CMR#4 | #b for CMR#1, #f for CMR#5 | #c for CMR#2, #g for CMR#6 | #d for CMR#3, #h for CMR#7 |
| NZP-IMR | #A for CMR#0, #E for CMR#4 | #B for CMR#1, #F for CMR#5 | #C for CMR#2, #G for CMR#6 | #D for CMR#3, #H for CMR#7 |
| NZP-IMR by CMR | VARY DEPENDING ON ASPECT 1/2/3 | | | |

FIG. 17

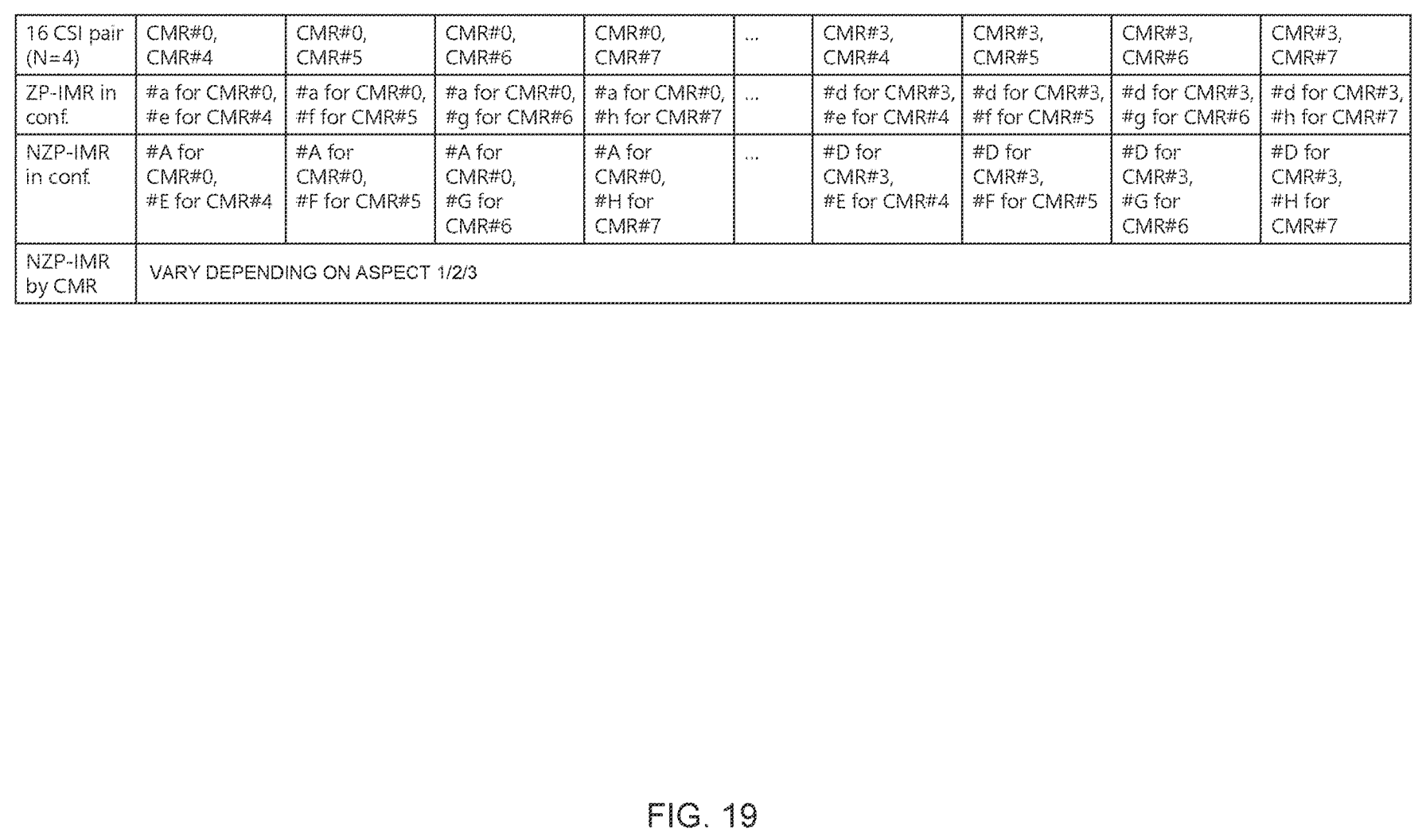

| 16 CSI pair (N=4) | CMR#0, CMR#4 | CMR#0, CMR#5 | CMR#0, CMR#6 | CMR#0, CMR#7 | ... | CMR#3, CMR#4 | CMR#3, CMR#5 | CMR#3, CMR#6 | CMR#3, CMR#7 |
|---|---|---|---|---|---|---|---|---|---|
| ZP-IMR in conf. | #a for CMR#0, #e for CMR#4 | #a for CMR#0, #f for CMR#5 | #a for CMR#0, #g for CMR#6 | #a for CMR#0, #h for CMR#7 | ... | #d for CMR#3, #e for CMR#4 | #d for CMR#3, #f for CMR#5 | #d for CMR#3, #g for CMR#6 | #d for CMR#3, #h for CMR#7 |
| NZP-IMR in conf. | #A for CMR#0, #E for CMR#4 | #A for CMR#0, #F for CMR#5 | #A for CMR#0, #G for CMR#6 | #A for CMR#0, #H for CMR#7 | ... | #D for CMR#3, #E for CMR#4 | #D for CMR#3, #F for CMR#5 | #D for CMR#3, #G for CMR#6 | #D for CMR#3, #H for CMR#7 |
| NZP-IMR by CMR | VARY DEPENDING ON ASPECT 1/2/3 | | | | | | | | |

FIG. 19

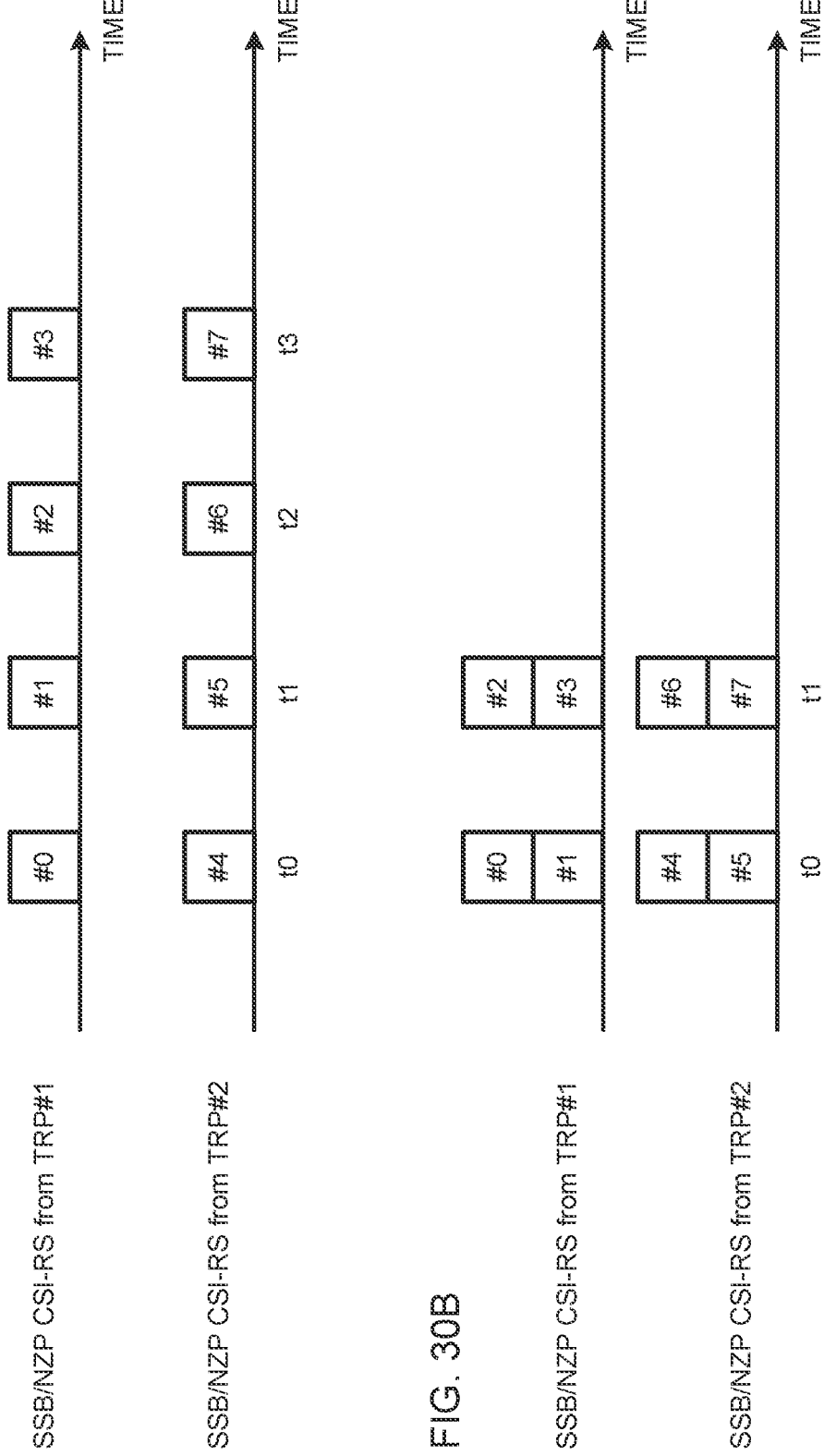

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, one or a plurality of transmission/reception points (TRPs) (multi-TRP) that perform DL transmission (for example, PDSCH transmission) to a user terminal (User Equipment (UE)) by using one or a plurality of panels (multi-panel) are under study.

However, in NR specifications thus far, such as Rel. 15, multi-panel/TRP is not considered, and thus how to perform CSI measurement and reporting in a case where the multi-panel/TRP is used is indefinite. Unless the CSI measurement and reporting are performed appropriately, system performance degradation, such as throughput reduction, may occur.

Thus, an object of the present disclosure is to provide a terminal, a radio communication method, and a base station that appropriately perform CSI measurement and reporting for multi-panel/TRP.

Solution to Problem

A terminal according to one aspect of the present disclosure includes a receiving section that receives configuration information related to a plurality of pairs of channel measurement resources, and a control section that controls, on the basis of the configuration information, group-based beam reporting or channel state information reporting for a plurality of transmission/reception points.

Advantageous Effects of Invention

According to one aspect of the present disclosure, it is possible to appropriately perform CSI measurement and reporting for multi-panel/TRP.

BRIEF DESCRIPTION OF DRAWINGS

FIG. 1 is a diagram to show CSI report configuration (CSI-ReportConfig) of 3GPP Rel. 16.

FIG. 5 is a diagram to show a relationship between a CSI pair, ZP-IMR, and NZP-IMR in option 1-1 of the first embodiment.

FIG. 7 is a diagram to show a relationship between a CSI pair, ZP-IMR, and NZP-IMR in option 1-2 of the first embodiment.

FIG. 9 is a diagram to show a relationship between a CSI pair, ZP-IMR, and NZP-IMR in option 1-3 of the first embodiment.

FIG. 11 is a diagram to show a relationship between a CSI pair, ZP-IMR, and NZP-IMR in option 1-4 of the first embodiment.

FIG. 13 is a diagram to show a relationship between a CSI pair, ZP-IMR, and NZP-IMR in option 2-1 of the second embodiment.

FIG. 15 is a diagram to show a relationship between a CSI pair, ZP-IMR, and NZP-IMR in option 2-2 of the second embodiment.

FIG. 17 is a diagram to show a relationship between a CSI pair, ZP-IMR, and NZP-IMR in option 2-3 of the second embodiment.

FIG. 19 is a diagram to show a relationship between a CSI pair, ZP-IMR, and NZP-IMR in option 2-4 of the second embodiment.

FIGS. 30A and 30B are each a diagram to show an example of a challenge of beam pair measurement.

Figure 2:
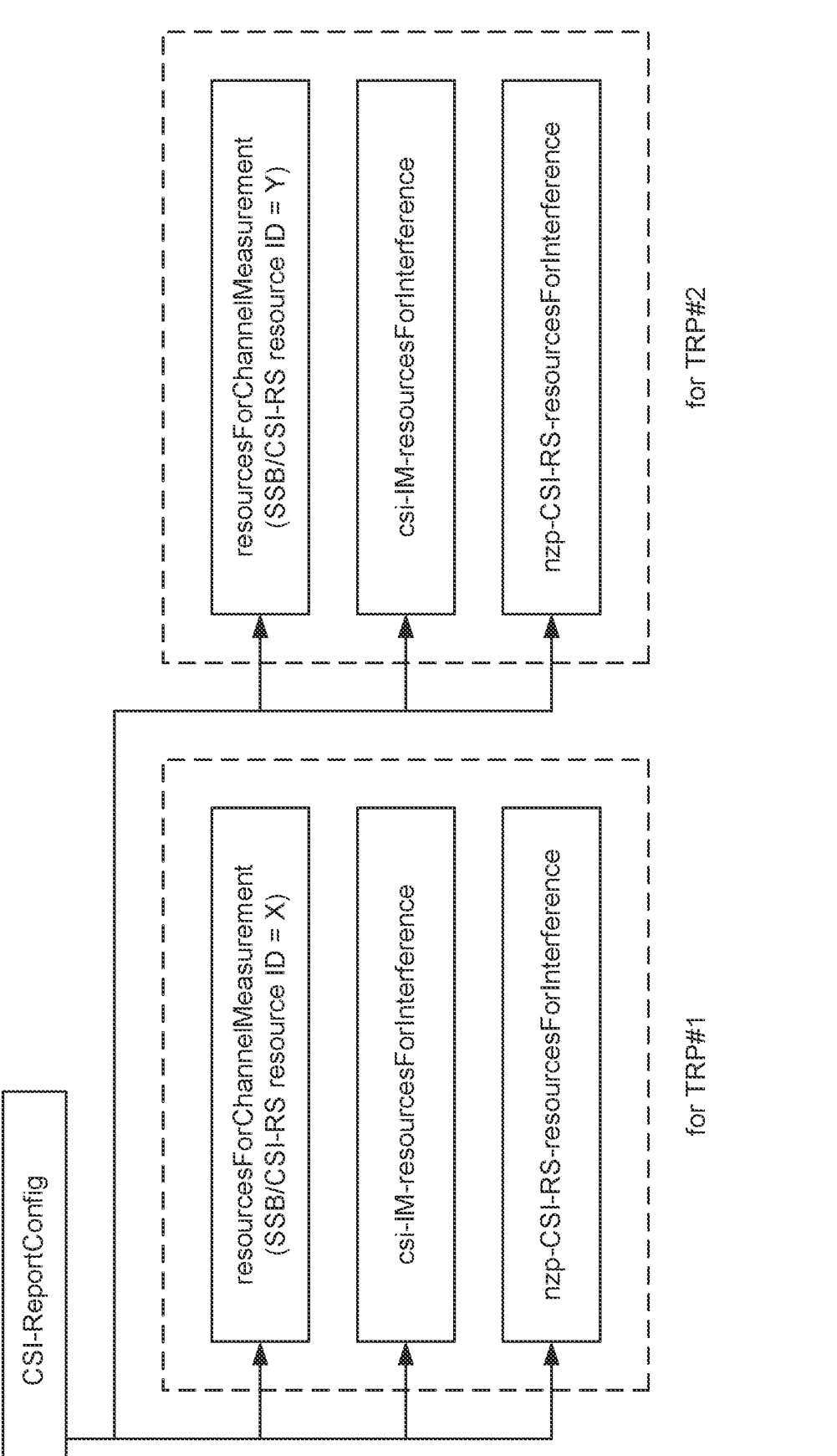
FIG. 2 is a diagram to show a first example of CSI report configuration according to implicit IMR configuration.

DESCRIPTION OF EMBODIMENTS (CSI Report (CSI Report or Reporting))

In Rel-15 NR, a terminal (also referred to as a user terminal, User Equipment (UE), and so on) generates (also referred to as determines, calculates, estimates, measures, and so on) channel state information (CSI) on the basis of a reference signal (RS) (or resource for the RS), and transmits (also referred to as reports, feeds back, and so on) the generated CSI to a network (for example, a base station). The CSI may be transmitted to the base station with use of, for example, an uplink control channel (for example, a Physical Uplink Control Channel (PUCCH)) or an uplink shared channel (for example, a Physical Uplink Shared Channel (PUSCH)).

The RS used for generation of the CSI may be, for example, at least one of a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), and the like.

The CSI-RS may include at least one of a non-zero power (NZP) CSI-RS and CSI-Interference Management (CSI-IM). The SS/PBCH block is a block including an SS and PBCH (and corresponding DMRS), and may be referred to as an SS block (SSB) and so on. The SS may include at least one of a primary synchronization signal (PSS) and a secondary synchronization signal (SSS).

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in Layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The UE may receive information related to CSI reporting (report configuration information) to control the CSI reporting on the basis of the report configuration information. The report configuration information may be, for example, a radio resource control (RRC) information element (IE) "CSI-ReportConfig." Note that in the present disclosure, the RRC IE may be interchangeably interpreted as an RRC parameter, a higher layer parameter, and the like.

The report configuration information (for example, the RRC IE "CSI-ReportConfig") may include, for example, at least one of the following.

Information related to CSI report type (report type information, for example, RRC IE "reportConfigType")

Information related to one or more quantities of CSI to be reported (one or more CSI parameters) (report quantity information, for example, RRC IE "reportQuantity")

Information related to RS resource used for generation of the quantities (the CSI parameters) (resource information, for example, RRC IE "CSI-ResourceConfigId")

Information related to frequency domain as target for CSI reporting (frequency domain information, for example, RRC IE "reportFreqConfiguration")

For example, the report type information may indicate a periodic CSI (P-CSI) report, an aperiodic CSI (A-CSI) report, or a semi-permanent (semi-persistent) CSI report (Semi-Persistent CSI (SP-CSI)) report.

The report quantity information may specify at least one combination of the above-described CSI parameters (for example, the CRI, RI, PMI, CQI, LI, L1-RSRP, and the like).

The resource information may be an ID of the RS resource. The RS resource may include, for example, a non-zero power CSI-RS resource or SSB and a CSI-IM resource (for example, a zero power CSI-RS resource).

The frequency domain information may indicate frequency granularity of the CSI reporting. The frequency granularity may include, for example, a wide band and a sub-band. The wide band is an entire CSI reporting band. For example, the wide band may be an entire certain carrier (component carrier (CC), cell, serving cell), or may be an entire bandwidth part (BWP) in a certain carrier. The wide band may be expressed in other words with a CSI reporting band, an entire CSI reporting band, and so on.

The sub-band is a part of the wide band, may be constituted by one or more resource blocks (RBs) or physical resource blocks (PRBs). A size of the sub-band may be determined depending on a size of the BWP (the number of PRBs).

The frequency domain information may indicate which of a PMI for the wide band or a PMI for the sub-band is reported (the frequency domain information may include, for example, an RRC IE "pmi-FormatIndicator" used for determination of any one of wideband PMI reporting or subband PMI reporting). The UE may determine frequency granularity of the CSI reporting (in other words, either the wideband PMI reporting or the subband PMI reporting) on the basis of at least one of the above-described report quantity information and frequency domain information.

When the wideband PMI reporting is configured (determined), one wideband PMI may be reported for the entire CSI reporting band. On the other hand, when the subband PMI reporting is configured, a single wideband indication $i_1$ may be reported for the entire CSI reporting band, and a subband indication (one subband indication) $i_2$ of each of one or more sub-bands in the entire CSI reporting (for example, a subband indication of each sub-band) may be reported.

The UE performs channel estimation by using a received RS to estimate a channel matrix H. The UE feeds back an index (PMI) determined on the basis of the estimated channel matrix.

The PMI may indicate a precoder matrix (also simply referred to as a precoder) considered by the UE to be appropriate for use in downlink (DL) transmission to the UE. Each value of the PMI may correspond to one precoder matrix. A set of PMI values may correspond to a set of different precoder matrixes referred to as a precoder codebook (also simply referred to as a codebook).

The CSI report may include CSI of one or more types in a spatial domain (space domain). For example, the CSI may include at least one of a first type (type 1 CSI) used for selection of a single beam and a second type (type 2 CSI) used for selection of multiple beams. The single beam may be expressed in other words with a single layer, and the multiple beams may be expressed in other words with a plurality of beams. The type 1 CSI may not assume multi-user multiple input multiple output (MIMO), and the type 2 CSI may assume the multi-user MIMO.

The above-described codebook may include a codebook for the type 1 CSI (also referred to as a type 1 codebook and so on) and a codebook for the type 2 CSI (also referred to as a type 2 codebook and so on). The type 1 CSI may include type 1 single panel CSI and type 1 multi-panel CSI, and different codebooks (type 1 single panel codebook and type 1 multi-panel codebook) may be defined.

In the present disclosure, type 1 and type I may be interchangeably interpreted. In the present disclosure, type 2 and type II may be interchangeably interpreted.

An uplink control information (UCI) type may include at least one of Hybrid Automatic Repeat reQuest ACKnowledgement (HARQ-ACK), a scheduling request (SR), and CSI. The UCI may be delivered on a PUCCH, or may be delivered on a PUSCH.

In Rel-15 NR, the UCI can include one CSI part for wideband PMI feedback. CSI report #n includes PMI wideband information if reported.

In Rel-15 NR, the UCI can include two CSI parts for subband PMI feedback. CSI part 1 includes wideband PMI information. CSI part 2 includes one piece of wideband PMI information and several pieces of subband PMI information. CSI part 1 and CSI part 2 are coded separately.

In Rel-15 NR, a report setting for N (N≥1) CSI report configurations and a resource setting for M (M≥1) CSI resource configurations are configured for the UE by a higher layer. For example, the CSI report configuration (CSI-ReportConfig) includes a setting for resources for channel measurement (resourcesForChannelMeasurement), a setting for a CSI-IM resource for interference (csi-IM-ResourceForInterference), a setting for an NZP-CSI-RS for interference (nzp-CSI-RS-ResourceForInterference), a report quantity (reportQuantity), and the like. Each of the setting for the resources for channel measurement, the setting for the CSI-IM resource for interference, and the setting for the NZP-CSI-RS for interference is associated with a CSI resource configuration (CSI-ResourceConfig, CSI-ResourceConfigId). The CSI resource configuration includes a CSI-RS resource set list (csi-RS-ResourceSetList, for example, NZP-CSI-RS resource sets or CSI-IM resource sets).

For both FR 1 and FR 2, evaluation and definition of CSI reporting for transmission of at least one of DL multiple TRPs and multiple panels are under study in order to enable hypotheses about more dynamic channels/interference for NCJT.

(Multi-TRP)

For NR, one or a plurality of transmission/reception points (TRPs) (multiple TRPs (multi TRP (MTRP))) that perform DL transmission to the UE by using one or a plurality of panels (multiple panels) are under study. The UE that performs UL transmission to the one or plurality of TRPs by using the one or plurality of panels is also under study.

Note that the plurality of TRPs may correspond to the same cell identifier (ID), or may correspond to different cell IDs. The cell ID may be a physical cell ID, or may be a virtual cell ID.

The multiple TRPs (TRP #1 and TRP #2) may be connected to each other by an ideal/non-ideal backhaul, and information, data, and the like may be exchanged. From respective TRPs of the multiple TRPs, different codewords (Code Words (CWs)) and different layers may be transmitted. As a mode of multi-TRP transmission, non-coherent joint transmission (NCJT) may be used.

In the NCJT, for example, TRP 1 performs modulation mapping for a first codeword to transmit a first number of layers (for example, 2 layers) by performing layer mapping and to transmit a first PDSCH by using first precoding. TRP 2 performs modulation mapping for a second codeword to transmit a second number of layers (for example, 2 layers) by performing layer mapping and to transmit a second PDSCH by using second precoding.

Note that a plurality of PDSCHs (multiple PDSCHs) for which the NCJT is performed may be defined as PDSCHs partially or fully overlapping with each other with respect to at least one of time and frequency domains. In other words, a first PDSCH from a first TRP and a second PDSCH from a second TRP may overlap with each other in at least one of time and frequency resources.

It may be assumed that these first PDSCH and second PDSCH are not in a quasi-co-location (QCL) relationship (not quasi-co-located). Reception of the multiple PDSCHs may be interpreted as simultaneous reception of PDSCHs other than a certain QCL type (for example, QCL type D).

A plurality of PDSCHs (which may be referred to as multiple PDSCHs) from multiple TRPs may be scheduled with use of one piece of DCI (single DCI (S-DCI), single PDCCH) (single master mode). One piece of DCI may be transmitted from one TRP of the multiple TRPs. A plurality of PDSCHs from multiple TRPs may be scheduled with use of a plurality of pieces of DCI (multiple DCI (M-DCI), multiple PDCCHs) (multi-master mode). The plurality of pieces of DCI may be transmitted from the multiple TRPs. The UE may assume that separate CSI reports related to respective TRPs are transmitted to different TRPs. Such CSI feedback may be referred to as separate feedback, separate CSI feedback, and so on. In the present disclosure, "separate" and "independent" may be interchangeably interpreted.

Note that CSI feedback to transmit, to one TRP, a CSI report related to both TRPs may be used. Such CSI feedback may be referred to as joint feedback, joint CSI feedback, and so on.

For example, in a case of the separate feedback, the UE is configured so as to transmit, to TRP #1, a CSI report for TRP #1 by using a certain PUCCH (PUCCH 1) and to transmit, to TRP #2, a CSI report for TRP #2 by using another PUCCH (PUCCH 2). In a case of the joint feedback, the UE transmits, to TRP #1 or TRP #2, the CSI report for TRP #1 and the CSI report for TRP #2.

According to such a multi-TRP scenario, more flexible transmission control using a channel having satisfactory quality is possible.

In multi-TRP transmission, CSI for a plurality of different TRPs is normally different from each other, and thus how to perform measurement and reporting of the CSI for the plurality of different TRPs is indefinite. For one TRP, a hypothesis about a channel/interference varies depending on determination (traffic) of peripheral TRP transmission.

For example, a CSI report for the separate feedback (which may be referred to as a separate CSI report) may be configured with use of one CSI report configuration (CSI-ReportConfig) associated with one TRP.

The CSI report configuration may correspond to one interference hypothesis about one TRP (in other words, different CSI report configurations may be used for each interference hypothesis for each TRP). The CSI report configuration may correspond to a plurality of interference hypotheses about one TRP (in other words, different CSI report configurations may be used for each TRP, and one CSI report configuration may be associated with a plurality of interference hypotheses about a certain TRP).

For example, a CSI report for the joint feedback (which may be referred to as a joint CSI report) may be configured with use of one CSI report configuration (CSI-ReportConfig) associated with a plurality of TRPs.

The CSI report configuration may correspond to one interference hypothesis about each of the plurality of TRPs (in other words, a CSI report including CSI with interference hypothesis #1 about TRP #1 and CSI with interference hypothesis #1 about TRP #2 may be configured with use of a certain CSI report configuration, and a CSI report including CSI with interference hypothesis #2 about TRP #1 and CSI with interference hypothesis #1 about TRP #2 may be configured with use of another CSI report configuration). The CSI report configuration may correspond to a plurality of interference hypotheses about each of the plurality of TRPs (in other words, a CSI report including two pieces of CSI with interference hypotheses #1 and #2 about TRP #1 and two pieces of CSI with interference hypotheses #3 and #4 about TRP #2 may be configured with use of one CSI report configuration).

Note that the CSI report configuration for the joint CSI report may include resource configuration for each TRP (at least one of the setting for the resources for channel measurement, the setting for the CSI-IM resource for interference, and the setting for the NZP-CSI-RS for interference). Resource configuration for the certain TRP may be included in a resource configuration group (resource setting group) for configuration.

Note that the resource configuration group may be identified by a configured resource configuration group index. The resource configuration group and a report group may be interchangeably interpreted. The resource configuration group index (which may be simply referred to as a group index) may indicate a TRP-related CSI report (which TRP a certain CSI report (or CSI report configuration, CSI resource configuration, CSI-RS resource set, CSI-RS resources, TCI state, QCL, or the like) corresponds to). For example, group index #i may correspond to TRP #i.

The CSI report configuration for the separate CSI report may be referred to as separate CSI report configuration, separate CSI configuration, and so on. The CSI report configuration for the joint CSI report may be referred to as joint CSI report configuration, joint CSI configuration, and so on.

For MTRP, dynamically switching between single-TRP (STRP) transmission and MTRP transmission depending on a channel state and the like is preferable. For the switching, CSI as described below is required:

CSI for TRP 1 (first TRP) under assumption of STRP transmission (also hereinafter referred to as CSI_A)

CSI for TRP 2 (second TRP) under assumption of STRP transmission (also hereinafter referred to as CSI_B)

CSI for TRP 1 with consideration of inter-TRP/beam interference from TRP 2, the CSI being under assumption of MTRP NCJT transmission (also hereinafter referred to as CSI_C)

CSI for TRP 2 with consideration of inter-TRP/beam interference from TRP 1, the CSI being under assumption of MTRP NCJT transmission (also hereinafter referred to as CSI_D)

<CMR and IMR>

When interference measurement is performed with use of the CSI-IM, respective CSI-RS resources for channel measurement are associated with CSI-IM resources in units of resources in accordance with ordering of CSI-RS resources and CSI-IM resources in a corresponding resource set. The number of CSI-RS resources for channel measurement may be the same as the number of CSI-IM resources.

In a case of ZP-CSI-RS-based interference measurement, a CSI-RS resource for channel measurement (CMR) and a CSI-RS resource for interference measurement (IMR) are associated for each resource. In other words, one-to-one mapping.

When $K_s$ (>1) resources are configured in a corresponding resource set for channel measurement, the UE needs to derive a CSI parameter other than a CRI subject to a reported CRI. CRI k (k≥0) corresponds to the (k+1) th configured entry of related nzp-CSI-RSResource in corresponding nzp-CSI-RS-ResourceSet for channel measurement, and corresponds to the (k+1) th configured entry of related csi-IM-Resource in corresponding csi-IM-ResourceSet (if configured).

In other words, CRI k (k≥0) corresponds to the (k+1) th configured CMR and the (k+1) th configured IMR.

<Aperiodic CSI>

In a case of aperiodic CSI, each trigger state configured with use of a higher layer parameter "CSI-AperiodicTriggerState" is associated with one or a plurality of CSI report configurations (CSI-ReportConfig). Each CSI report configuration is linked to a periodic, semi-persistent, or aperiodic resource setting.

When one resource configuration is configured, the resource configuration (given by a higher layer parameter resourcesForChannelMeasurement) is for channel measurement for calculation of L1-RSRP or L1-SINR.

When two resource configurations are configured, the first resource configuration (given by a higher layer parameter resourcesForChannelMeasurement) is for channel measurement, and the second resource configuration (given by a higher layer parameter csi-IM-ResourcesForInterference or nzp-CSI-RS-ResourcesForInterference) is for interference measurement performed with use of CSI-IM or an NZP-CSI-RS.

When three resource configurations are configured, the first resource configuration (given by a higher layer parameter resourcesForChannelMeasurement) is for channel measurement, the second resource configuration (given by a higher layer parameter csi-IM-ResourcesForInterference) is for CSI-IM-based interference measurement, and the third resource configuration (given by a higher layer parameter nzp-CSI-RS-ResourcesForInterference) is for NZP-CSI-RS-based interference measurement.

When the aperiodic CSI is applied, NR may support interference measurement based on only a ZP-CSI-RS, only an NZP-CSI-RS, and both a ZP-CSI-RS and an NZP-CSI-RS.

<Periodic or Semi-Persistent CSI>

When periodic or semi-persistent CSI is applied, each CSI report configuration (CSI-ReportConfig) is linked to a periodic or semi-persistent resource setting.

When one resource configuration (given by a higher layer parameter resourcesForChannelMeasurement) is configured, the resource configuration is for channel measurement for L1-RSRP calculation.

When two resource configurations are configured, the first resource configuration (given by a higher layer parameter resourcesForChannelMeasurement) is for channel measurement, and the second resource configuration (given by a higher layer parameter csi-IM-ResourcesForInterference) is for interference measurement performed with use of CSI-IM.

When the periodic or semi-persistent CSI is applied, NR may support only interference measurement based on the ZP-CSI-RS.

<CSI-IM Resource and CSI-RS Resource>

A CSI-IM resource for interference measurement, an NZP-CSI-RS resource for interference measurement, and an NZP-CSI-RS resource for channel measurement are configured by higher layer signaling for one or more CSI resource configurations for channel and interference measurement.

The UE may assume that the NZP-CSI-RS resource for channel measurement and the CSI-IM resource for interference measurement configured for one CSI report are QCLed with respect to "QCL-TypeD" for each resource. When the NZP-CSI-RS resource is used for interference measurement, the UE may assume that the NZP-CSI-RS resource for channel measurement and the CSI-IM resource or NZP-CSI-RS resource for interference measurement configured for one CSI report are QCLed with respect to "QCL-TypeD."

In other words, when ZP-CSI-RS-based interference measurement is applied, the UE may assume that the same receive beam as that indicated by a base station (gNB) for channel measurement is used for the interference measurement.

<CSI Report Configuration>

FIG. 1 is a diagram to show CSI report configuration (CSI-ReportConfig) of 3GPP Rel. 16. As shown in FIG. 1, as CSI report configurations that are RRC information elements, resourcesForChannelMeasurement (CMR), csi-IM-ResourcesForInterference (ZP-IMR), nzp-CSI-RS-ResourcesForInterference (NZP-IMR), reportConfigType, and the like are configured. reportConfigType includes periodic, semiPersistentOnPUCCH, semiPersistentOnPUSCH, and aperiodic.

<Implicit IMR Configuration>

For the joint CSI report, a CMR for certain CSI (TRP) may correspond to an IMR for other CSI (TRP). According to this configuration, two pieces of CSI included in a joint CSI report for NCJT transmission is expected to follow actual inter-TRP interference well (to be sufficiently accurate for direct scheduling). Also, an additional CSI update is not requested by network implementation.

The UE may assume that explicit IMR configuration for inter-TRP interference is not performed for certain CSI report configuration (joint CSI configuration). In this case, assumption of an additional IMR in a case where the joint CSI configuration is configured may be defined by specifications.

For example, in the joint CSI configuration, the UE may assume that, in addition to or in place of an explicit ZP-IMR/NZP-IMR, a CMR for a certain TRP (resource specified by resourcesForChannelMeasurement) is included in (or the same as) an additional NZP-IMR for another TRP (CMR). Here, the additional NZP-IMR for another TRP (CMR) is not configured explicitly.

Information related to the additional NZP-IMR may be determined by specifications beforehand, or may be notified to the UE with use of at least one of RRC, a MAC CE, and DCI.

FIG. 2 is a diagram to show a first example of the CSI report configuration according to implicit IMR configuration. In FIG. 2, SSB/CSI-RS ID=Y is not explicitly configured for an NZP-IMR for TRP #1, and SSB/CSI-RS ID=X is not explicitly configured for an NZP-IMR for TRP #2.

Even when explicit NZP-IMR configuration is absent, the UE may assume that SSB/CSI-RS ID=Y corresponding to a CMR for TRP #2 corresponds to the NZP-IMR for TRP #1, and may assume that SSB/CSI-RS ID=X corresponding to a CMR for TRP #1 corresponds to the NZP-IMR for TRP #2. The UE may perform channel/interference measurement and the like on the basis of these assumptions to perform joint CSI reporting.

Figure 3:
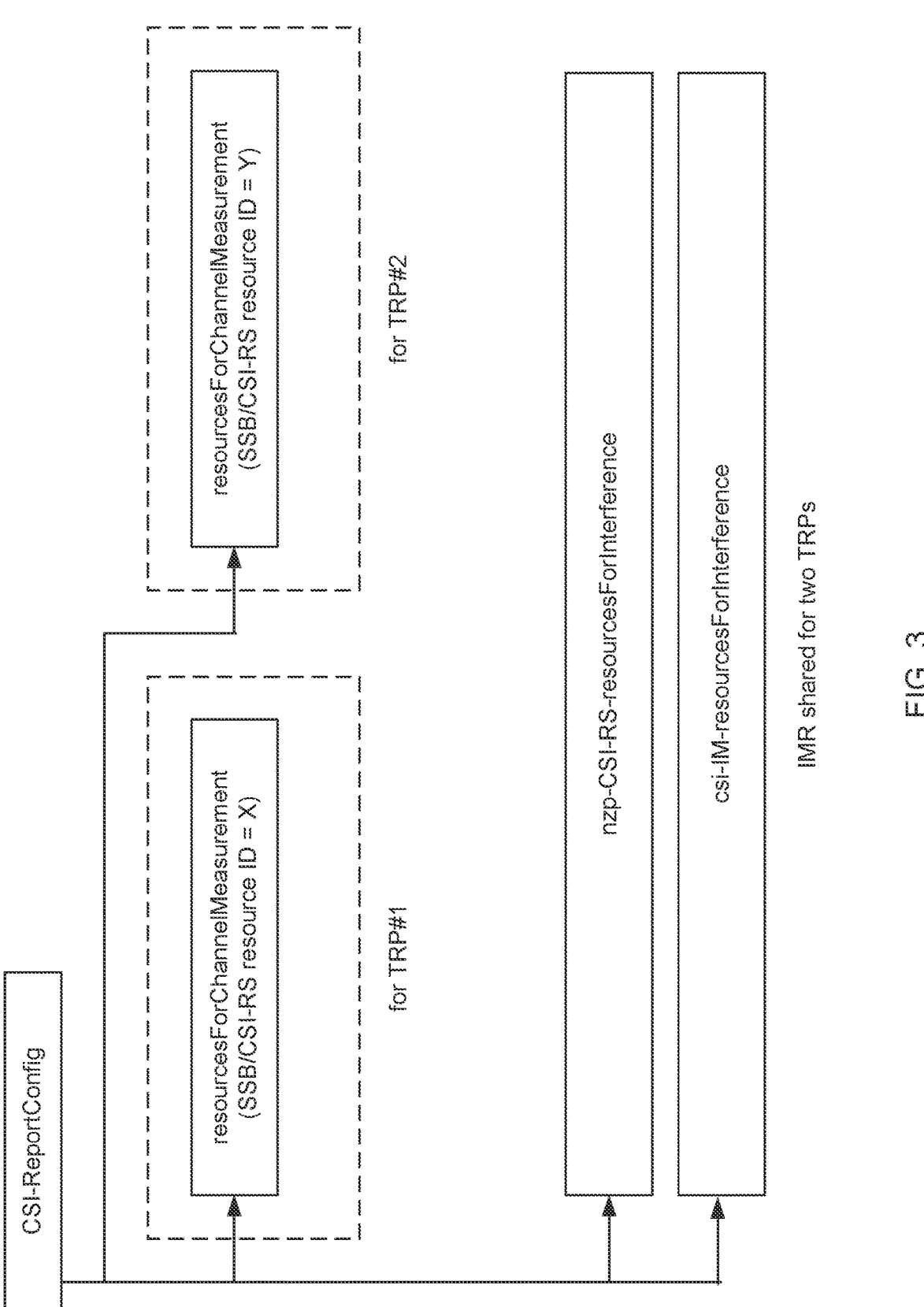
FIG. 3 is a diagram to show a second example of the CSI report configuration according to the implicit IMR configuration.

FIG. 3 is a diagram to show a second example of the CSI report configuration according to the implicit IMR configuration. FIG. 3 is similar to FIG. 2, and thus overlapping description is not performed. FIG. 3 differs from FIG. 2 in that a ZP-IMR and an NZP-IMR are configured for (to be shared with) two TRPs in common.

The UE may use, as the NZP-IMR for TRP #1, the commonly configured NZP-IMR and SSB/CSI-RS ID=Y corresponding to the CMR for TRP #2. The UE may use, as the NZP-IMR for TRP #2, the commonly configured NZP-IMR and SSB/CSI-RS ID=X corresponding to the CMR for TRP #1.

However, in NR specifications thus far, such as Rel. 15, multi-panel/TRP is not considered, and thus how to perform CSI measurement and reporting in a case where the multi-panel/TRP is used is indefinite. Also, how to perform a joint between measurement/reporting in a multi-panel/TRP hypothesis and measurement/reporting in a single-panel/TRP hypothesis is indefinite.

Unless the CSI measurement and reporting are performed appropriately, system performance degradation, such as throughput reduction, may occur. Thus, the inventors of the present invention came up with the idea of a method for appropriately performing CSI measurement and reporting for multi-panel/TRP.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted.

In the present disclosure, a panel, an Uplink (UL) transmission entity, a TRP, a spatial relation, a control resource set (CORESET), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP ID and a TRP may be interchangeably interpreted.

In the present disclosure, NCJT, NCJT using multiple TRPs, multiple PDSCHs using NCJT, multiple PDSCHs, a plurality of PDSCHs from multiple TRPs, and the like may be interchangeably interpreted. Note that the multiple PDSCHs may mean a plurality of PDSCHs with an overlap of at least a part of time resources (for example, 1 symbol), may mean a plurality of PDSCHs with an overlap of entire time resources (for example, all symbols), may mean a plurality of PDSCHs without an overlap of entire time resources, may mean a plurality of PDSCHs to deliver the same TB or the same CW, or may mean a plurality of PDSCHs to which different UE beams (spatial domain reception filters, QCL parameters) are applied.

In the present disclosure, a normal TRP, a single TRP, an S-TRP, a single TRP system, single-TRP transmission, and a single PDSCH may be interchangeably interpreted. In the present disclosure, multiple TRPs, MTRP, a multi-TRP system, multi-TRP transmission, and multiple PDSCHs may be interchangeably interpreted. In the present disclosure, single DCI, a single PDCCH, multiple TRPs based on single DCI, and activation of two TCI states on at least one TCI code point may be interchangeably interpreted.

In the present disclosure, a single TRP, a channel using a single TRP, a channel using one TCI state/spatial relation, a case that multiple TRPs are not enabled by RRC/DCI, a case that a plurality of TCI states/spatial relations are not enabled by RRC/DCI, a case that one CORESET pool index (CORESETPoolIndex) value is not configured for any CORESET, and any code point of a TCI field is not mapped to two TCI states, a case that communication with one transmission/reception point is performed, and a case that a single TRP is applied may be interchangeably interpreted.

In the present disclosure, a CRI index, a CRI report index, and a reported CRI index may be interchangeably interpreted.

In the present disclosure, an index, an ID, an indicator, a resource ID, and the like may be interchangeably interpreted. In the present disclosure, a beam, a TCI, a TCI state, a DL TCI state, a UL TCI state, a unified TCI state, QCL, QCL assumption, a spatial relation, spatial relation information, a precoder, and the like may be interchangeably interpreted.

In the present disclosure, a setting for resources for channel measurement, channel measurement resources, CSI-RS resources for channel measurement, resourcesForChannelMeasurement, CMRs, and CMR resources may be interchangeably interpreted.

In the present disclosure, CSI-IM, a CSI-IM resource, a ZP-IMR, a ZP-IMR resource, a ZP-CSI-RS, a ZP-CSI-RS resource, a setting for a CSI-IM resource for interference, a resource for CSI-IM-based interference measurement, csi-IM-ResourceForInterference, a resource for interference measurement, and a CSI-RS resource for interference measurement may be interchangeably interpreted.

In the present disclosure, NZP-IM, an NZP-IM resource (NZP-IMR), an NZP-IMR resource, an NZP-CSI-RS, an NZP-CSI-RS resource, a setting for an NZP-CSI-RS resource for interference, a resource for NZP-CSI-RS-based interference measurement, nzp-CSI-RS-ResourcesForInterference, an interference measurement resource, and a CSI-RS resource for interference measurement may be interchangeably interpreted.

In the present disclosure, a CSI report, a CSI report configuration, a CSI configuration, a resource configuration, and a resource setting may be interchangeably interpreted. In the present disclosure, "support," "control," "controllable," "operate," "operable," "perform," and "performable" may be interchangeably interpreted.

(Radio Communication Method)

A UE may determine, on the basis of at least one of a first channel measurement resource (CMR) corresponding to a first transmission/reception point (TRP) and a second channel measurement resource (CMR) corresponding to a second transmission/reception point (TRP), a first interference measurement resource (ZP-IMR/NZP-IMR) corresponding to the first TRP or a second interference measurement resource (ZP-IMR/NZP-IMR) corresponding to the second TRP. The UE may transmit a channel state information (CSI) report on the basis of the first CMR and the second CMR.

The UE may transmit a report of a CSI pair including the first CMR and the second CMR corresponding to the same interference measurement resource (ZP-IMR/NZP-IMR).

The first TRP corresponds to TRP #1 mentioned below, and the second TRP corresponds to TRP #2 mentioned below. The first CMR corresponds to at least one of CMR #0 to CMR #3 mentioned below, and the second CMR corresponds to at least one of CMR #4 to CMR #7 mentioned below. The first interference measurement resource corresponds to at least one of CSI-IM (ZP-IMR) #a to CSI-IM (ZP-IMR) #d or at least one of NZP-IM MA to NZP-IM #D mentioned below. The second interference measurement resource corresponds to, for example, at least one of CSI-IM (ZP-IMR) Ife to CSI-IM (ZP-IMR) or at least one of NZP-IM ME to NZP-IM #H mentioned below. In the present disclosure, "first" and "second" may be interchangeably interpreted.

In the present disclosure, a case that A (or B) corresponds/relates to B (or A), a case that the UE assumes/determines A (or B) as B (or A), and a case that the UE assumes/determines B (or A) on the basis of A (or B) may be interchangeably interpreted.

First Embodiment

In a case of periodic and semi-persistent CSI, NR may support only interference measurement based on a ZP-CSI-RS. When a specific (new) RRC parameter is configured, the UE may assume, as the NZP-IMR for the first TRP, a CMR for another TRP, and may assume, as an NZP-IMR for another TRP, the CMR for the first TRP. When the above-described specific (new) RRC parameter is not configured, the UE may perform interference measurement on the basis of only a ZP-IMR (CSI-IM).

In other words, when a specific higher layer parameter (RRC parameter) is configured, the UE may determine the first interference measurement resource with non-zero power (NZP-IMR) on the basis of the second CMR.

[Option 1-1]

In CMR configuration, up to N CMR (SSB/NZP-CSI-RS) resources may be configured for each TRP. Accordingly, in CSI report configuration for CMRs (resourcesForChannelMeasurement) in MTRP NCJT CSI configuration, a total of up to 2N CMRs may be configured.

In CSI-IM configuration, a total of up to N ZP-CSI-RS resources may be configured, and two TRPs may share the ZP-CSI-RS resources.

Figure 4:
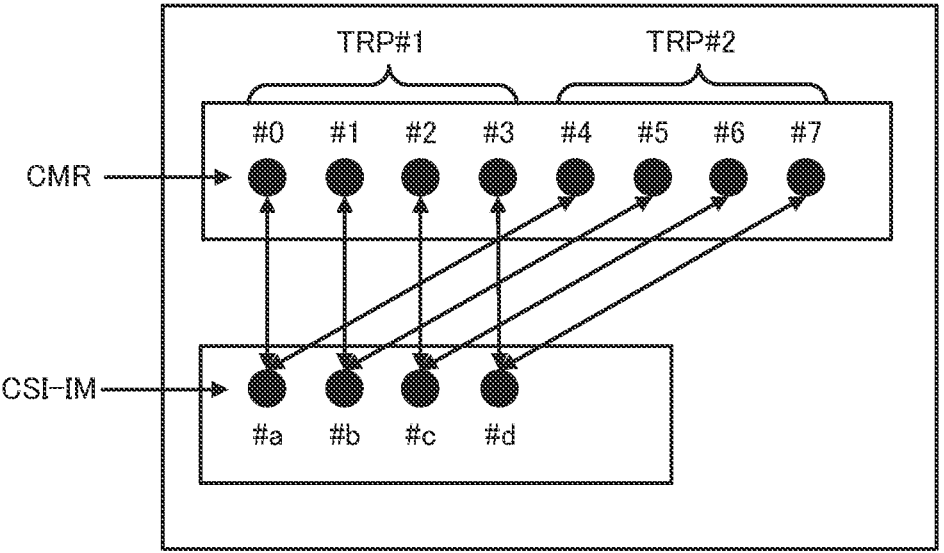
FIG. 4 is a diagram to show a relationship between a CMR and CSI-IM in option 1-1 of a first embodiment.

FIG. 4 is a diagram to show a relationship between a CMR and CSI-IM in option 1-1 of a first embodiment. As shown in FIG. 4, up to 4 CMRs are configured for each of TRP #1 and TRP #2. CMR #0 and CMR #4 correspond to CSI-IM #a, CMR #1 and CMR #5 correspond to CSI-IM #b, CMR #2 and CMR #6 correspond to CSI-IM #c, and CMR #3 and CMR #7 correspond to CSI-IM #d.

FIG. 5 is a diagram to show a relationship between a CSI pair, ZP-IMR, and NZP-IMR in option 1-1 of the first embodiment. FIG. 5 corresponds to FIG. 4. As shown in FIG. 5, CMRs corresponding to the same ZP-IMR (CSI-IM) and different TRPs are configured as the CSI pair. It is assumed that the ZP-IMR and NZP-IMR are configurations in the CSI report configuration (the same applies in another drawing).

The UE measures N pairs of CSI from two TRPs with NCJT assumption. Each pair includes the k th CMR associated with each TRP (includes, for example, the k th CMR and the (k+N) th CMR as a pair). For two pieces of CSI of each pair, the UE may assume one-to-one mapping between a CMR associated with each TRP and CSI-IM.

After measuring the respective pairs, the UE may report one (or a plurality of) CSI pair selected for reporting, out of the respective pairs. The UE may determine a pair to be reported/the number of pairs on the basis of configuration based on specifications, RRC, or the like. For the selected CSI pair, the UE may transmit a CSI report including CRIs described in the following option 1-1-1 and option 1-1-2.

[[Option 1-1-1]] Two CRIs (CRI j and CRI j+N) may correspond to two pieces of CSI having one piece of CSI based on the configured (j+1) th CMR and (j+1) th CSI-IM and another piece of CSI based on the configured (j+1+N) th CMR and (j+1) th CSI-IM.

[[Option 1-1-2]] One CRI (CRI j) may correspond to two pieces of CSI having one piece of CSI based on the configured (j+1) th CMR and (j+1) th CSI-IM and another piece of CSI based on the configured (j+1+N) th CMR and (j+1) th CSI-IM. In option 1-1-2, one CRI (CRI j) means two CRIs to report CRI j and CRI j+N.

There is a possibility that a favorable beam pair is reported by group-based beam reporting. In that case, the favorable beam pair is narrowed down, and thus configuring only N pairs as described in option 1-1 can simplify processing. In this case, it is only necessary that a base station (gNB) performs configuration so as to obtain CSI for the reported beam pair.

[Option 1-2]

In CMR configuration, up to N CMR (SSB/NZP-CSI-RS) resources may be configured for each TRP. Accordingly, in CSI report configuration for CMRs (resourcesForChannelMeasurement) in MTRP NCJT CSI configuration, a total of up to 2N CMRs may be configured.

In CSI-IM configuration, a total of up to N ZP-CSI-RS resources may be configured, and two TRPs may share the ZP-CSI-RS resources.

Figure 6:
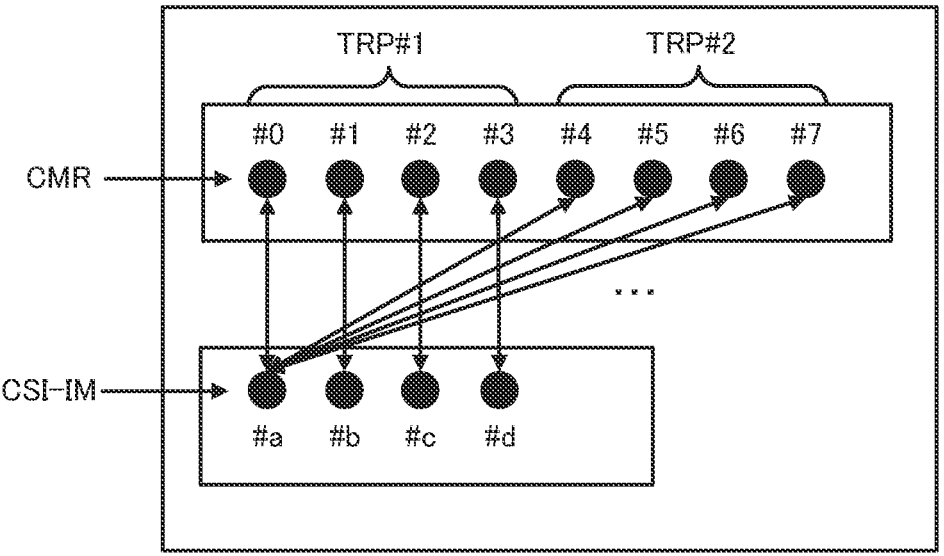
FIG. 6 is a diagram to show a relationship between a CMR and CSI-IM in option 1-2 of the first embodiment.

FIG. 6 is a diagram to show a relationship between a CMR and CSI-IM in option 1-2 of the first embodiment. As shown in FIG. 6, up to 4 CMRs are configured for each of TRP #1 and TRP #2. CMR #0 and CMR #4 to CMR #7 correspond to CSI-IM #a, CMR #1 and CMR #4 to CMR #7 correspond to CSI-IM #b, CMR #2 and CMR #4 to CMR #7 correspond to CSI-IM #c, and CMR #3 and CMR #4 to CMR #7 correspond to CSI-IM #d. Note that illustrations of some correspondence are omitted.

FIG. 7 is a diagram to show a relationship between a CSI pair, ZP-IMR, and NZP-IMR in option 1-2 of the first embodiment. FIG. 7 corresponds to FIG. 6. As shown in FIG. 7, CMRs corresponding to the same ZP-IMR (CSI-IM) and different TRPs are configured as the CSI pair. The example of FIG. 7 differs from the example of FIG. 5 in that the number of pairs is N×N.

The UE measures N×N CSI pairs from two TRPs with NCJT assumption. The respective pairs include all conceivable combinations of CMRs associated with respective TRPs. For two pieces of CSI of each pair, the UE assumes the k th CSI-IM for interference measurement of a CSI pair including the k th CMR.

For one CSI pair selected for reporting, the UE may report two CRIs (CRI j (j≥0) and CRI p (p≥N)). These two CRIs may correspond to two pieces of CSI having one piece of CSI based on the configured (j+1) th CMR and (j+1) th CSI-IM and another piece of CSI based on the configured p th CMR and (j+1) th CSI-IM.

[Option 1-3]

In CMR configuration, up to N CMR (SSB/NZP-CSI-RS) resources may be configured for each TRP. Accordingly, in CSI report configuration for CMRs in MTRP NCJT CSI configuration, a total of up to 2N CMRs may be configured.

In CSI-IM configuration, up to N ZP-CSI-RS resources are configured for each TRP. Accordingly, in CSI report configuration for ZP-IMRs in MTRP NCJT CSI configuration, a total of up to 2N ZP-CSI-RS resources may be configured.

Figure 8:
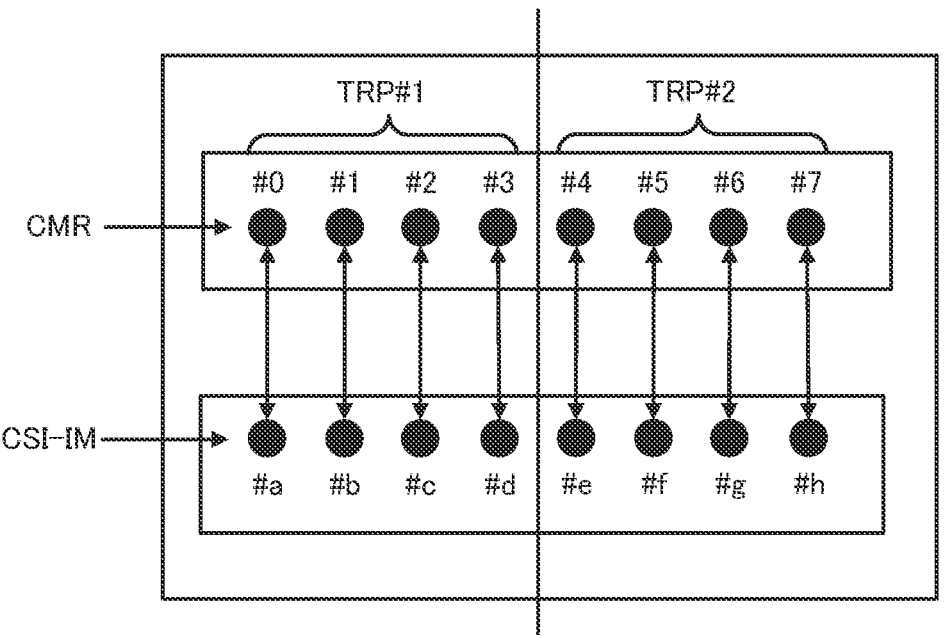
FIG. 8 is a diagram to show a relationship between a CMR and CSI-IM in option 1-3 of the first embodiment.

FIG. 8 is a diagram to show a relationship between a CMR and CSI-IM in option 1-3 of the first embodiment. As shown in FIG. 8, up to 4 CMRs are configured for each of TRP #1 and TRP #2. CMR #0 to CMR #7 correspond to CSI-IM #a to CSI-IM #h in one-to-one correspondence.

FIG. 9 is a diagram to show a relationship between a CSI pair, ZP-IMR, and NZP-IMR in option 1-3 of the first embodiment. FIG. 9 corresponds to FIG. 8. FIG. 9 differs from FIG. 5 in that two ZP-IMRs (pieces of CSI-IM) for one CSI pair are present.

The UE measures N pairs of CSI from two TRPs with NCJT assumption. Each pair includes the k th CMR associated with each TRP (includes, for example, the k th CMR and the (k+N) th CMR as a pair). For two pieces of CSI of each pair, the UE may assume one-to-one mapping between a CMR and CSI-IM.

After measuring the respective pairs, the UE may report one or a plurality of CSI pairs selected for reporting, out of the respective pairs. The UE may determine a pair to be reported/the number of pairs on the basis of configuration based on specifications, RRC, or the like. For the selected CSI pair, the UE may transmit a CSI report including CRIs described in the following option 1-3-1 and option 1-3-2.

[[Option 1-3-1]] Two CRIs (CRI j and CRI j+N) may correspond to two pieces of CSI having one piece of CSI based on the configured (j+1) th CMR and (j+1) th CSI-IM and another piece of CSI based on the configured (j+1+N) th CMR and (j+1+N) th CSI-IM.

[[Option 1-3-2]] One CRI (CRI j) may correspond to two pieces of CSI having one piece of CSI based on the configured (j+1) th CMR and (j+1) th CSI-IM and another piece of CSI based on the configured (j+1+N) th CMR and (j+1+N) th CSI-IM. In option 1-3-2, one CRI (CRI j) means two CRIs to report CRI j and CRI j+N.

[Option 1-4]

In CMR configuration, up to N CMRs (SSBs/NZP-CSI-RSs) may be configured for each TRP. Accordingly, in CSI report configuration for CMRs (resourcesForChannelMeasurement) in MTRP NCJT CSI configuration, a total of up to 2N CMRs may be configured.

In CSI-IM configuration, up to N ZP-CSI-RS resources are configured for each TRP. Accordingly, in CSI report configuration for ZP-IMRs in MTRP NCJT CSI configuration, a total of up to 2N ZP-CSI-RS resources may be configured.

Figure 10:
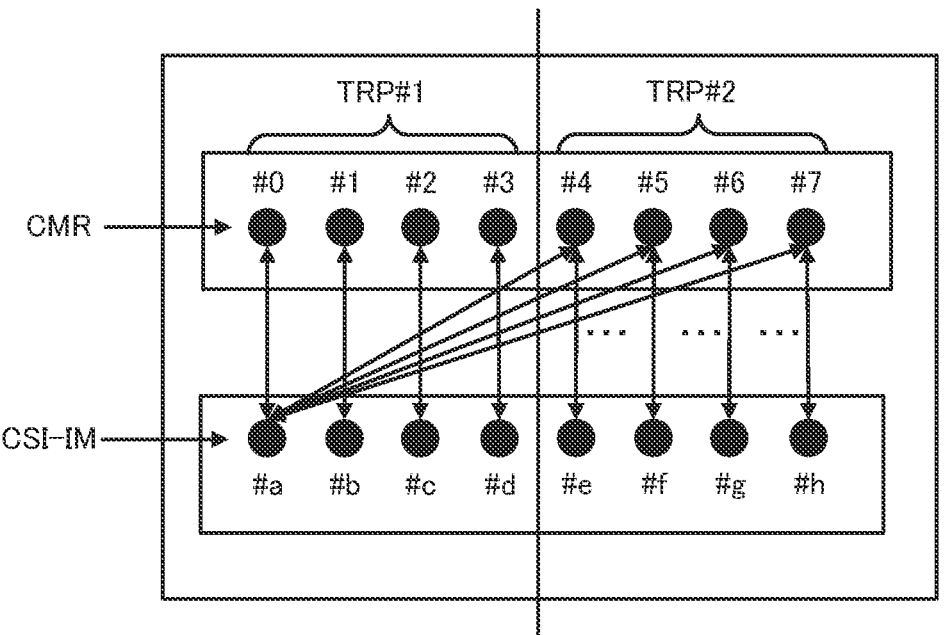
FIG. 10 is a diagram to show a relationship between a CMR and CSI-IM in option 1-4 of the first embodiment.

FIG. 10 is a diagram to show a relationship between a CMR and CSI-IM in option 1-4 of the first embodiment. As shown in FIG. 10, up to 4 CMRs are configured for each of TRP #1 and TRP #2. CMR #0 and CMR #4 to CMR #7 correspond to CSI-IM #a, CMR #1 and CMR #4 to CMR #7 correspond to CSI-IM #b, CMR #2 and CMR #4 to CMR #7 correspond to CSI-IM #c, and CMR #3 and CMR #4 to CMR #7 correspond to CSI-IM #d. Furthermore, CMR #4 to CMR #7 correspond to CSI-IM Ife to CSI-IM #h in one-to-one correspondence. Note that illustrations of some correspondence are omitted.

FIG. 11 is a diagram to show a relationship between a CSI pair, ZP-IMR, and NZP-IMR in option 1-4 of the first embodiment. FIG. 11 corresponds to FIG. 10. As shown in FIG. 11, CMRs corresponding to the same ZP-IMR (CSI-IM) are configured as the CSI pair. FIG. 11 differs from FIG. 7 in that two ZP-IMRs (pieces of CSI-IM) for one CSI pair are present.

The UE measures N×N CSI pairs from two TRPs with NCJT assumption. The respective pairs include all conceivable combinations of CMRs associated with respective TRPs. For two pieces of CSI of each pair, the UE assumes the k th CSI-IM for interference measurement of the k th CMR.

For one CSI pair selected for reporting, the UE may report two CRIs (CRI j (j≥0) and CRI p (p≥N)). These two CRIs may correspond to two pieces of CSI having one piece of CSI based on the configured (j+1) th CMR and (j+1) th CSI-IM and another piece of CSI based on the configured p th CMR and p th CSI-IM.

According to the first embodiment, with respect to CSI measurement related to NCJT CSI report configuration in a case of periodic and semi-persistent CSI, mapping between CMRs and ZP-IMRs/NZP-IMRs for two TRPs is definite.

Second Embodiment

In a case of aperiodic CSI, NR may support interference measurement based on only a ZP-CSI-RS, only an NZP-CSI-RS, and both a ZP-CSI-RS and an NZP-CSI-RS. In the aperiodic CSI, when interference measurement is configured on the basis of only the ZP-CSI-RS, a method according to each option of the first embodiment may be employed.

In the aperiodic CSI, when interference measurement is configured on the basis of only the ZP-CSI-RS or both the ZP-CSI-RS and the NZP-CSI-RS, any one of aspects 1 to 3 below may be employed.

[Aspect 1] For two pieces of CSI as a CSI pair, a UE does not assume a CMR for one TRP as an NZP-IMR for another TRP.

[Aspect 2] For two pieces of CSI as a CSI pair, the UE assumes a CMR for one TRP as an NZP-IMR for another TRP when indicated by a specific (new) RRC parameter.

[Aspect 3] For two pieces of CSI as a CSI pair of aperiodic CSI, the UE does not assume configuration of an NZP-CSI-RS for interference measurement when indicated by a specific (new) RRC parameter so as to assume a CMR for one TRP as an NZP-IMR for another TRP.

In aspects 1 to 3, at least one of option 2-1 to option 2-4 described below may be employed in mapping between a CMR and CSI-IM/NZP-CSI-RS (NZP-IMR). Option 2-1 to option 2-4 mainly differs from option 1-1 to option 1-4 in that an NZP-CSI-RS (NZP-IMR) for interference measurement is considered.

[Option 2-1]

In CMR configuration, up to N CMR (SSB/NZP-CSI-RS) resources may be configured for each TRP. Accordingly, in CSI report configuration for CMRs (resourcesForChannelMeasurement) in MTRP NCJT CSI configuration, a total of up to 2N CMRs may be configured.

In CSI-IM configuration, a total of up to N ZP-CSI-RS resources may be configured, and two TRPs may share the ZP-CSI-RS resources.

For the NZP-CSI-RS for interference measurement, a total of up to N NZP-CSI-RS resources may be configured, and two TRPs may share the NZP-CSI-RS resources.

Figure 12:
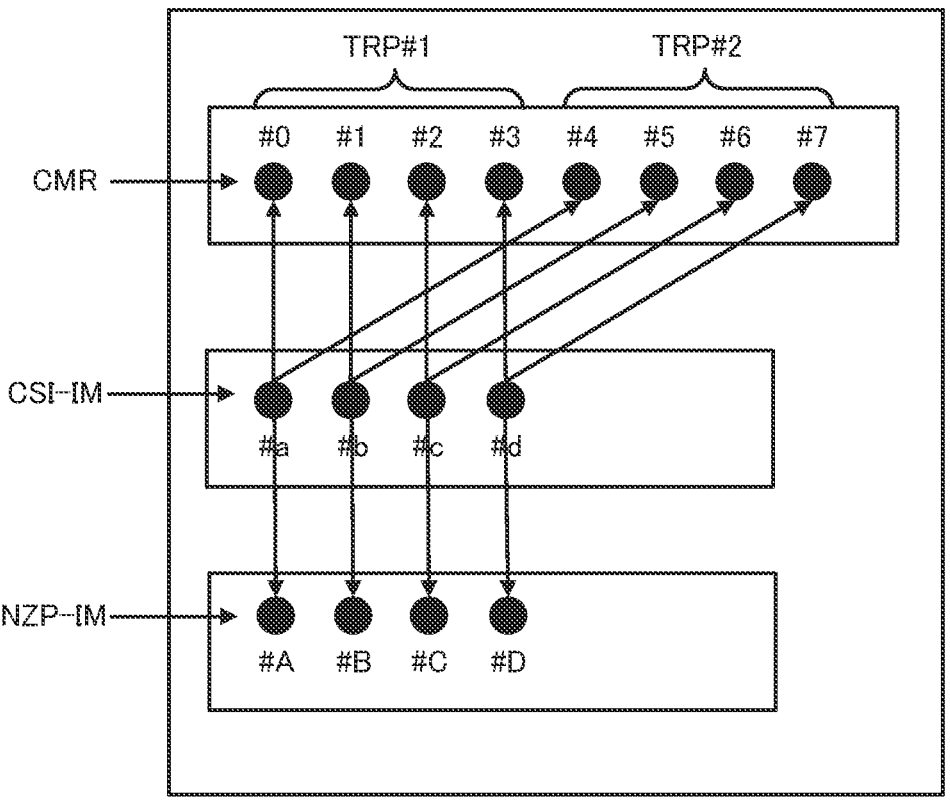
FIG. 12 is a diagram to show a relationship between a CMR, CSI-IM, and NZP-IM in option 2-1 of a second embodiment.

FIG. 12 is a diagram to show a relationship between a CMR, CSI-IM, and NZP-IM in option 2-1 of a second embodiment. As shown in FIG. 12, up to 4 CMRs are configured for each of TRP #1 and TRP #2. CMR #0 and CMR #4 correspond to CSI-IM #a and NZP-IM #A, CMR #1 and CMR #5 correspond to CSI-IM #b and NZP-IM #B, CMR #2 and CMR #6 correspond to CSI-IM #c and NZP-IM #C, and CMR #3 and CMR #7 correspond to CSI-IM #d and NZP-IM D.

FIG. 13 is a diagram to show a relationship between a CSI pair, ZP-IMR, and NZP-IMR in option 2-1 of the second embodiment. FIG. 13 corresponds to FIG. 12. As shown in FIG. 13, CMRs corresponding to the same ZP-IMR (CSI-IM) and NZP-IM and different TRPs are configured as the CSI pair. It is assumed that the ZP-IMR and NZP-IMR are configurations in the CSI report configuration (the same applies in another drawing). It is assumed that the ZP-IMR and NZP-IMR are configurations in the CSI report configuration (the same applies in another drawing). NZP-IMR by CMR is an NZP-IMR assumed with use of a CMR, and varies depending on which of the above-mentioned aspects 1 to 3 is employed (the same applies in another drawing).

The UE measures N pairs of CSI from two TRPs with NCJT assumption. Each pair includes the k th CMR associated with each TRP (includes, for example, the k th CMR and the (k+N) th CMR as a pair). For two pieces of CSI of each pair, the UE may assume one-to-one mapping between a CMR associated with each TRP and CSI-IM/NZP-CSI-RS.

After measuring the respective pairs, the UE may report one or a plurality of CSI pairs selected for reporting, out of the respective pairs. The UE may determine a pair to be reported/the number of pairs on the basis of configuration based on specifications, RRC, or the like. For the selected CSI pair, the UE may transmit a CSI report including CRIs described in the following option 2-1-1 and option 2-1-2.

[[Option 2-1-1]] Two CRIs (CRI j and CRI j+N) may correspond to two pieces of CSI having one piece of CSI based on the configured (j+1) th CMR and (j+1) th CSI-IM/NZP-IM and another piece of CSI based on the configured (j+1+N) th CMR and (j+1) th CSI-IM/NZP-IM.

[[Option 2-1-2]] One CRI (CRI j) may correspond to two pieces of CSI having one piece of CSI based on the configured (j+1) th CMR and (j+1) th CSI-IM/NZP-IM and another piece of CSI based on the configured (j+1+N) th CMR and (j+1) th CSI-IM/NZP-IM. In option 1-1-2, one CRI (CRI j) means two CRIs to report CRI j and CRI j+N.

There is a possibility that a favorable beam pair is reported by group-based beam reporting. In that case, the favorable beam pair is narrowed down, and thus configuring only N pairs as described in option 2-1 can simplify processing. In this case, it is only necessary that a base station (gNB) performs configuration so as to obtain CSI for the reported beam pair.

[Option 2-2]

In CMR configuration, up to N CMR (SSB/NZP-CSI-RS) resources may be configured for each TRP. Accordingly, in CSI report configuration for CMRs (resourcesForChannelMeasurement) in MTRP NCJT CSI configuration, a total of up to 2N CMRs may be configured.

In CSI-IM configuration, a total of up to N ZP-CSI-RS resources may be configured, and two TRPs may share the ZP-CSI-RS resources.

For the NZP-CSI-RS for interference measurement, a total of up to N NZP-CSI-RS resources may be configured, and two TRPs may share the NZP-CSI-RS resources.

Figure 14:
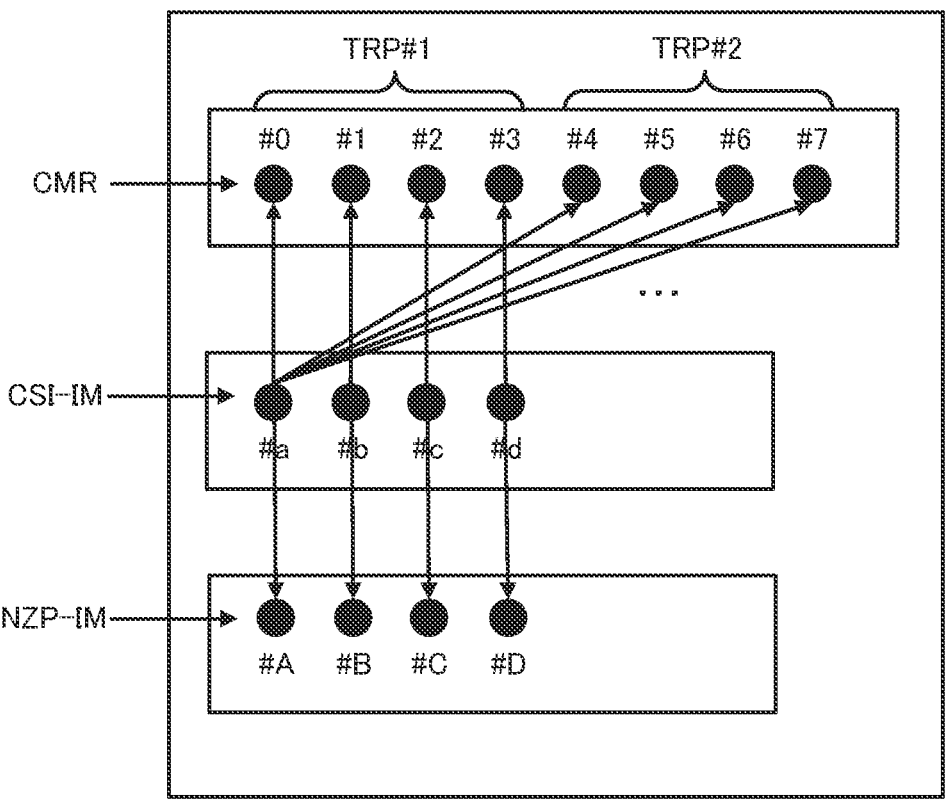
FIG. 14 is a diagram to show a relationship between a CMR and CSI-IM in option 2-2 of the second embodiment.

FIG. 14 is a diagram to show a relationship between a CMR and CSI-IM in option 2-2 of the second embodiment. As shown in FIG. 14, up to 4 CMRs are configured for each of TRP #1 and TRP #2. CMR #0 and CMR #4 to CMR #7 correspond to CSI-IM #a and NZP-IM #A, CMR #1 and CMR #4 to CMR #7 correspond to CSI-IM #b and NZP-IM #B, CMR #2 and CMR #4 to CMR #7 correspond to CSI-IM #c and NZP-IM #C, and CMR #3 and CMR #4 to CMR #7 correspond to CSI-IM #d and NZP-IM #D. Note that illustrations of some correspondence are omitted.

FIG. 15 is a diagram to show a relationship between a CSI pair, ZP-IMR, and NZP-IMR in option 2-2 of the second embodiment. FIG. 15 corresponds to FIG. 14. As shown in FIG. 15, CMRs corresponding to the same ZP-IMR (CSI-IM) and NZP-IM and different TRPs are configured as the CSI pair. The example of FIG. 15 differs from the example of FIG. 13 in that the number of pairs is N×N. "NZP-IMR by CMR" varies depending on which of the above-mentioned aspects 1 to 3 is employed.

The UE measures N×N CSI pairs from two TRPs with NCJT assumption. The respective pairs include all conceivable combinations of CMRs associated with respective TRPs. For two pieces of CSI of each pair, the UE assumes the k th CSI-IM and the k th NZP-IM for interference measurement of a CSI pair including the k th CMR.

For one CSI pair selected for reporting, the UE may report two CRIs (CRI j (j≥0) and CRI p (p≥N)). These two CRIs may correspond to two pieces of CSI having one piece of CSI based on the configured (j+1) th CMR and (j+1) th CSI-IM/NZP-IM and another piece of CSI based on the configured p th CMR and (j+1) th CSI-IM/NZP-IM.

[Option 2-3]

In CMR configuration, up to N CMRs (SSBs/NZP-CSI-RSs) may be configured for each TRP. Accordingly, in CSI report configuration for CMRs in MTRP NCJT CSI configuration, a total of up to 2N CMRs may be configured.

In CSI-IM configuration, up to N ZP-CSI-RS resources are configured for each TRP. Accordingly, in CSI report configuration for ZP-IMRs in MTRP NCJT CSI configuration, a total of up to 2N ZP-CSI-RS resources may be configured.

In NZP-IM configuration, up to N NZP-CSI-RS resources are configured for each TRP. Accordingly, a total of up to 2N NZP-CSI-RS resources may be configured in CSI report configuration for NZP-IMRs in MTRP NCJT CSI configuration.

Figure 16:
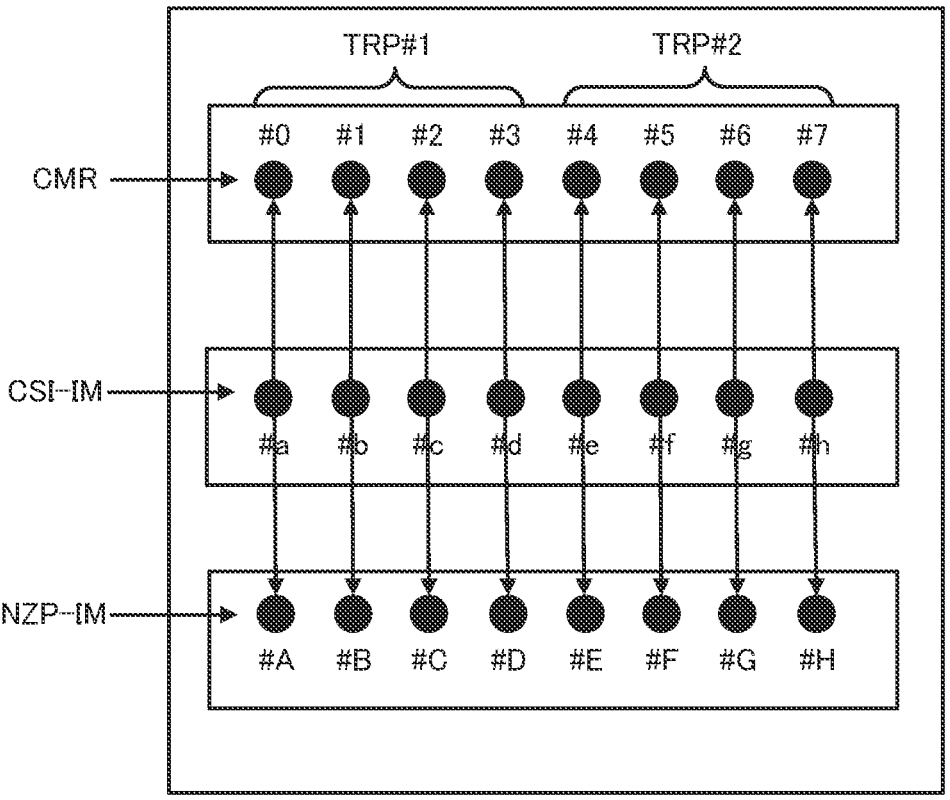
FIG. 16 is a diagram to show a relationship between a CMR and CSI-IM in option 2-3 of the second embodiment.

FIG. 16 is a diagram to show a relationship between a CMR and CSI-IM in option 2-3 of the second embodiment. As shown in FIG. 16, up to 4 CMRs are configured for each of TRP #1 and TRP #2. CMR #0 to CMR #7 correspond to CSI-IM #a to CSI-IM #h and NZP-IM #A to NZP-IM #H in one-to-one correspondence, respectively.

FIG. 17 is a diagram to show a relationship between a CSI pair, ZP-IMR, and NZP-IMR in option 2-3 of the second embodiment. FIG. 17 corresponds to FIG. 16. FIG. 17 differs from FIG. 13 in that two ZP-IMRs (pieces of CSI-IM) and two pieces of NZP-IM for one CSI pair are present.

The UE measures N pairs of CSI from two TRPs with NCJT assumption. Each pair includes the k th CMR associated with each TRP (includes, for example, the k th CMR and the (k+N) th CMR as a pair). For two pieces of CSI of each pair, the UE may assume one-to-one mapping between a CMR and CSI-IM/NZP-IM (NZP-CSI-RS for IM).

After measuring the respective pairs, the UE may report one or a plurality of CSI pairs selected for reporting, out of the respective pairs. The UE may determine a pair to be reported/the number of pairs on the basis of configuration based on specifications, RRC, or the like. For the selected CSI pair, the UE may transmit a CSI report including CRIs described in the following option 2-3-1 and option 2-3-2.

[[Option 2-3-1]] Two CRIs (CRI j and CRI j+N) may correspond to two pieces of CSI having one piece of CSI based on the configured (j+1) th CMR and (j+1) th CSI-IM/NZP-IM and another piece of CSI based on the configured (j+1+N) th CMR and (j+1+N) th CSI-IM/NZP-IM.

[[Option 2-3-2]] One CRI (CRI j) may correspond to two pieces of CSI having one piece of CSI based on the configured (j+1) th CMR and (j+1) th CSI-IM/NZP-IM and another piece of CSI based on the configured (j+1+N) th CMR and (j+1+N) th CSI-IM/NZP-IM. In option 1-3-2, one CRI (CRI j) means two CRIs to report CRI j and CRI j+N.

[Option 2-4]

In CMR configuration, up to N CMR (SSB/NZP-CSI-RS) resources may be configured for each TRP. Accordingly, in CSI report configuration for CMRs (resourcesForChannelMeasurement) in MTRP NCJT CSI configuration, a total of up to 2N CMRs may be present.

In CSI-IM configuration, up to N ZP-CSI-RS resources are configured for each TRP. Accordingly, in CSI report configuration for ZP-IMRs in MTRP NCJT CSI configuration, a total of up to 2N ZP-CSI-RS resources may be configured.

In NZP-IM configuration, up to N NZP-CSI-RS resources are configured for each TRP. Accordingly, in CSI report configuration for NZP-IMRs in MTRP NCJT CSI configuration, a total of up to 2N NZP-CSI-RS resources may be configured.

Figure 18:
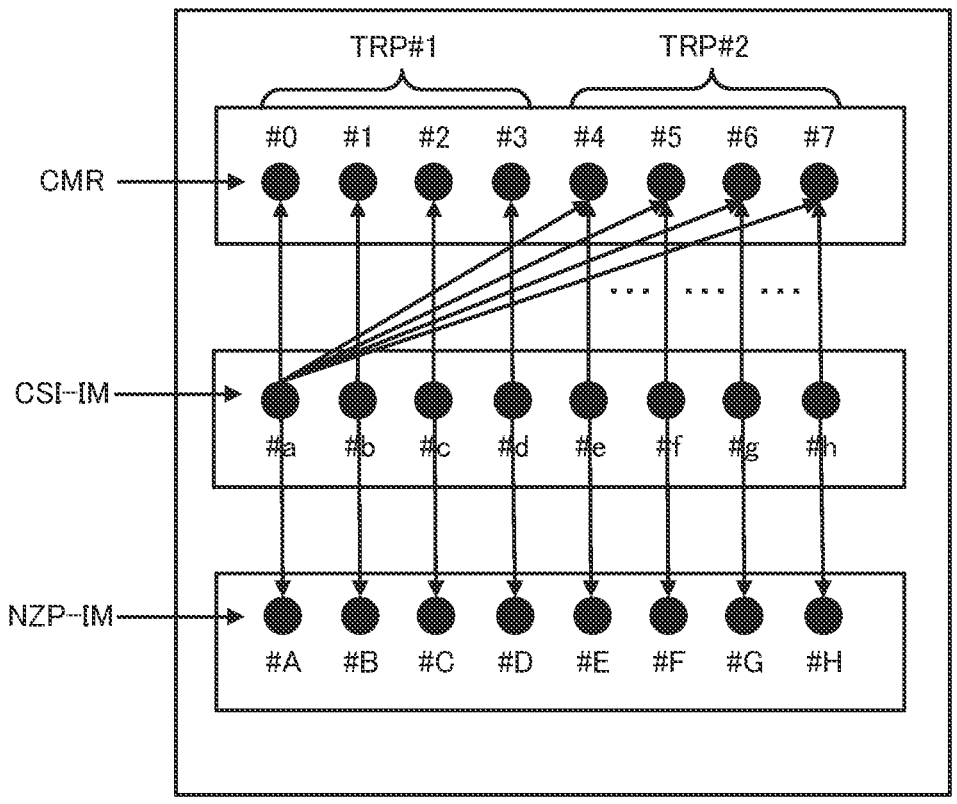
FIG. 18 is a diagram to show a relationship between a CMR and CSI-IM in option 2-4 of the second embodiment.

FIG. 18 is a diagram to show a relationship between a CMR and CSI-IM in option 2-4 of the second embodiment. As shown in FIG. 18, up to 4 CMRs are configured for each of TRP #1 and TRP #2. CMR #0 and CMR #4 to CMR #7 correspond to CSI-IM #a and NZP-IM #A, CMR #1 and CMR #4 to CMR #7 correspond to CSI-IM #b and NZP-IM #B, CMR #2 and CMR #4 to CMR #7 correspond to CSI-IM #c and NZP-IM #C, and CMR #3 and CMR #4 to CMR #7 correspond to CSI-IM #d and NZP-IM D. Furthermore, CMR #4 to CMR #7 correspond to CSI-IM Ife to CSI-IM #h and NZP-IM #A to NZP-IM #H in one-to-one correspondence. Note that illustrations of some correspondence are omitted.

FIG. 19 is a diagram to show a relationship between a CSI pair, ZP-IMR, and NZP-IMR in option 2-4 of the second embodiment. FIG. 19 corresponds to FIG. 18. As shown in FIG. 19, CMRs corresponding to the same ZP-IMR (CSI-IM) and NZP-IM are configured as the CSI pair. FIG. 19 differs from FIG. 15 in that two ZP-IMRs (pieces of CSI-IM) and two pieces of NZP-IM for one CSI pair are present.

The UE measures N×N CSI pairs from two TRPs with NCJT assumption. The respective pairs include all conceivable combinations of CMRs associated with respective TRPs. For two pieces of CSI of each pair, the UE assumes the k th CSI-IM/NZP-IM for interference measurement of the k th CMR.

For one CSI pair selected for reporting, the UE may report two CRIs (CRI j (j≥0) and CRI p (p≥N)). These two CRIs may correspond to two pieces of CSI having one piece of CSI based on the configured (j+1) th CMR and (j+1) th CSI-IM/NZP-IM and another piece of CSI based on the configured p th CMR and p th CSI-IM/NZP-IM.

According to the second embodiment, with respect to CSI measurement related to NCJT CSI report configuration in aperiodic CSI, mapping between CMRs and ZP-IMRs/NZP-IMRs for two TRPs is definite.

Third Embodiment

When applying joint channel state information reporting (joint CSI report), a UE receives configuration information (for example, CSI-ReportConfig) corresponding to both application of a channel measurement resource (CMR) for a plurality of transmission/reception points (multiple TRPs) and application of a CMR for a single TRP, and controls transmission of a CSI report on the basis of the configuration information. The UE may individually measure, for the single TRP, CMR resources measured as a CSI pair for the multiple TRPs (option 3-1). The UE may receive configuration information in which IMRs measured for the single TRP and IMRs (CSI-IM/NZP-IMRs) measured for the multiple TRPs are configured independently (individually), and may control transmission (generation) of a CSI report on the basis of the configuration information (option 3-2).

[Option 3-1]

When a joint CSI report corresponding to (or including) the most favorable CSI for the multiple TRPs and the most favorable CSI/second most favorable CSI from respective TRPs (two TRPs) for the single TRP is configured, CMR resources measured by the UE as the CSI pair for the multiple TRPs are measured by the UE for an individual single-TRP hypothesis (which may be referred to as a premise or an assumption).

In the present disclosure, the CSI pair and a beam pair may be interchangeably interpreted. The single TRP may mean a case that only one TRP out of multiple TRPs performs transmission to the UE, or may mean the one TRP.

Note that in the present disclosure, a case that a certain resource (CMR/CSI-IM/NZP-IMR) is configured before another resource (CMR/CSI-IM/NZP-IMR) (for example, first) may mean a case that an index of the certain resource is less than an index of the another resource. A case that a certain resource is configured subsequently to (after) another resource may mean a case that an index of the certain resource is greater than an index of the another resource.

In CMR resource configuration, the following option 3-1-1 or option 3-1-2 is employed in a sequence of CMR resources from two TRPs.

[Option 3-1-1]

Figure 20:
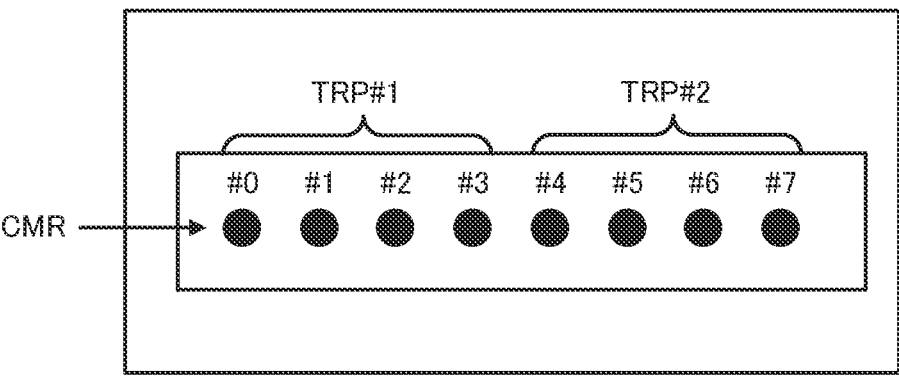
FIG. 20 is a diagram to show an example of CMR configuration of option 3-1-1 in a third embodiment.

Similarly to the first embodiment and the second embodiment, a CMR corresponding to TRP #1 may be configured first, and a CMR corresponding to TRP #2 may be configured subsequently. FIG. 20 is a diagram to show an example of CMR configuration of option 3-1-1 in a third embodiment. As shown in FIG. 20, CMR #0 to CMR #3 correspond to TRP #1, and CMR #4 to CMR #7 correspond to TRP #2. CMR #0 to CMR #3 and CMR #4 to CMR #7 may each correspond to 4 beams (CSI) of one single TRP. As CSI pairs for the multiple TRPs, 4 or 16 CSI pairs described in any one of the first embodiment/the second embodiment may be configured. In other words, CMR #0 to CMR #7 are used for both the single-TRP and the multi-TRP.

[Option 3-1-2]

Figure 21:
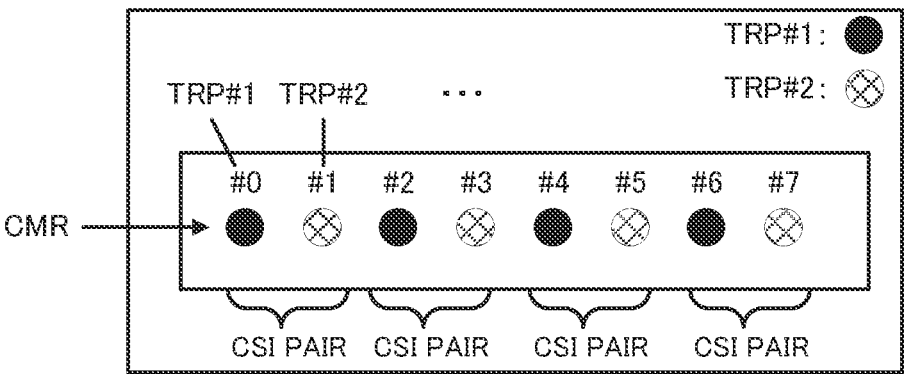
FIG. 21 is a diagram to show an example of CMR configuration of option 3-1-2 in the third embodiment.

CMRs may be configured in order for each CSI pair. For example, for each CSI pair, TRP #1 may be configured first, and TRP #2 may be configured subsequently. FIG. 21 is a diagram to show an example of CMR configuration of option 3-1-2 in the third embodiment. As shown in FIG. 21, CMR #0, CMR #2, CMR #4, and CMR #6 correspond to TRP #1, and CMR #1, CMR #3, CMR #5, and CMR #7 correspond to TRP #2. CMR #0, CMR #2, CMR #4, and CMR #6 and CMR #1, CMR #3, CMR #5, and CMR #7 may each correspond to 4 beams (CSI) of one single TRP. A pair of CMR #0 and CMR #1, pair of CMR #2 and CMR #3, pair of CMR #4 and CMR #5, and pair of CMR #6 and CMR #7 may be configured as respective CSI pairs for the multiple TRPs. In other words, CMR #0 to CMR #7 are used for both the single-TRP and the multi-TRP.

In CRI reporting, a sequence of CRI indexes of the single TRP and a sequence of CSI indexes of the multiple TRPs may be swapped with each other. For example, the CRI indexes may be configured as described in option 3-1-3 or option 3-1-4, or may be determined by specifications beforehand as described in these options.

[Option 3-1-3]

Reported CRI k (k≥0) means CSI for the single TRP based on the (k+1) th CMR resource. CRI indexes corresponding to CSI for the multiple TRPs start from 2N. N is the number of CMR resources for each TRP. In other words, CSI for the single TRP may correspond to CRI indexes 0 to 2N−1, and CSI for the multiple TRPs may correspond to CRI indexes 2N or more. Similarly to the first embodiment and the second embodiment, CRI index j corresponding to the multiple TRPs corresponds to two CMR resources as a CSI pair (for example, the (j+1−2N) th CSI pair).

For example, CRI #0 to CRI #3 may correspond to TRP #1 (single TRP), CRI #4 to CRI #7 may correspond to TRP #2 (single TRP), and CRI #8 to CRI #11 may correspond to four CSI pairs for the multiple TRPs.

[Option 3-1-4]

CRI k (k≥0) means CSI for the multiple TRPs accompanied by a CSI pair. CRI indexes corresponding to the single TRP start from N. In other words, CSI for the multiple TRPs may correspond to CRI indexes 0 to N−1, and CSI for the multiple TRPs may correspond to CRI indexes N or more.

For example, CRI #0 to CRI #3 may correspond to four CSI pairs for the multiple TRPs, CRI #4 to CRI #7 may correspond to TRP #1 (single TRP), and CRI #8 to CRI #11 may correspond to TRP #2 (single TRP).

[Option 3-2]

IMR resources for a single-TRP hypothesis may be configured additionally, and may be TRP-specific resources. This IMR resources for the single-TRP hypothesis may be different from IMR resources for a multi-TRP hypothesis. A sequence of IMRs for the single TRP and a sequence of IMRs for the multiple TRPs may be swapped with each other. One-to-one mapping between a CMR and an IMR for the single-TRP hypothesis may be performed, for example, as described in the following option 3-2-1 or option 3-2-2.

[Option 3-2-1]

CSI-IM/NZP-IMR corresponding to the multiple TRPs may be configured first, and CSI-IM/NZP-IMR corresponding to the single TRP may be configured subsequently. The CSI-IM/NZP-IMR may be configured for TRP #1 first, and may be configured for TRP #2 subsequently.

Figure 22:
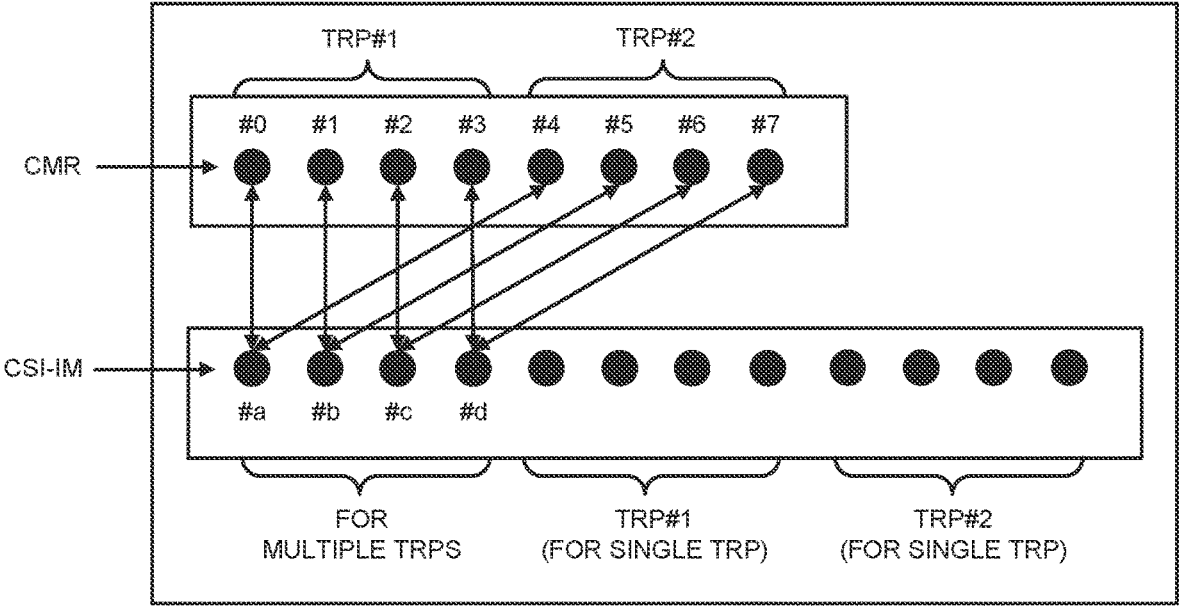
FIG. 22 is a diagram to show an example of CMR/CSI-IM configuration of option 3-2-1 in the third embodiment.

FIG. 22 is a diagram to show an example of CMR/CSI-IM configuration of option 3-2-1 in the third embodiment. FIG. 22 assumes option 1-1 of the first embodiment. Description of similarities to option 1-1 will be omitted. In FIG. 22, the CSI-IM configuration first performs configuration of CSI-IM corresponding to the multiple TRPs, and subsequently performs configuration in order of configuration of CSI-IM corresponding to TRP #1 (for the single TRP) and configuration of CSI-IM corresponding to TRP #2 (for the single TRP). Note that NZP-IMR configuration may also be similar to the CSI-IM configuration.

[Option 3-2-2]

CSI-IM/NZP-IMR corresponding to the single TRP may be configured first, and CSI-IM/NZP-IMR corresponding to the multiple TRPs may be configured subsequently. The CSI-IM/NZP-IMR may be configured for TRP #1 first, and may be configured for TRP #2 subsequently.

Figure 23:
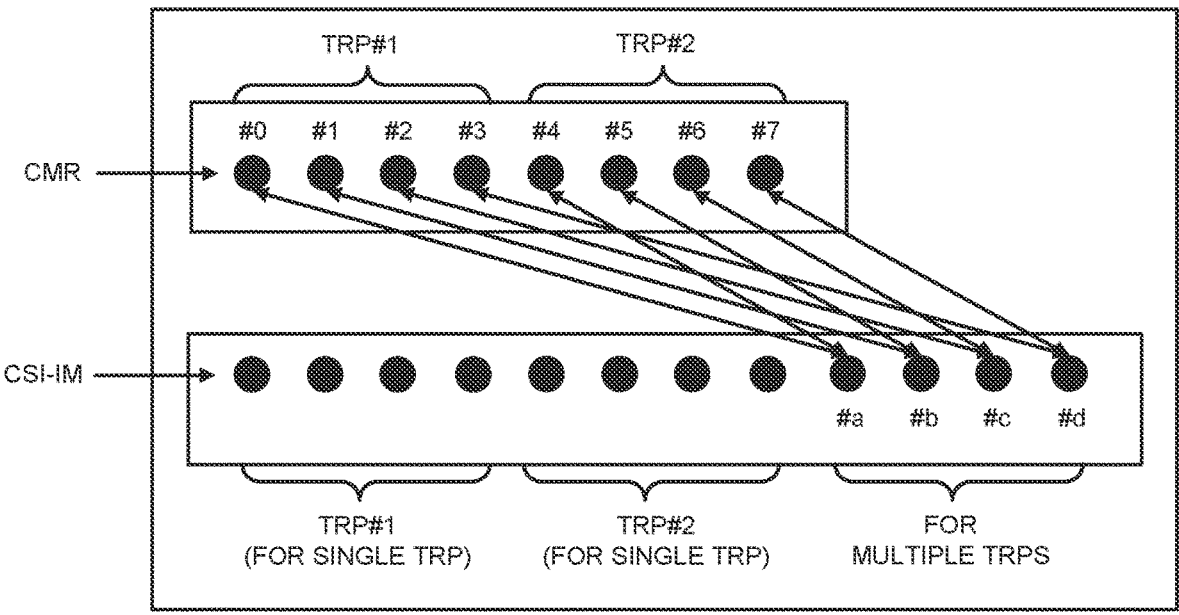
FIG. 23 is a diagram to show an example of CMR/CSI-IM configuration of option 3-2-2 in the third embodiment.

FIG. 23 is a diagram to show an example of CMR/CSI-IM configuration of option 3-2-2 in the third embodiment. FIG. 23 assumes option 1-1 of the first embodiment. Description of similarities to option 1-1 will be omitted. In FIG. 23, the CSI-IM configuration first performs configuration in order of configuration of CSI-IM corresponding to TRP #1 (for the single TRP) and configuration of CSI-IM corresponding to TRP #2 (for the single TRP), and subsequently performs configuration of CSI-IM corresponding to the multiple TRPs. Note that NZP-IMR configuration may also be similar to the CSI-IM configuration.

Option 3-2-1 and option 3-2-2 assume option 1-1 of the first embodiment, but may assume another option of the first embodiment and the second embodiment.

According to the third embodiment, a method for performing a joint between measurement/reporting in a multi-panel/TRP hypothesis and measurement/reporting in a single-panel/TRP hypothesis becomes definite. One CMR can be applied to both multiple panels and a single panel, and thus the number of configurations can be reduced, and throughput can be improved.

Fourth Embodiment

When applying joint channel state information reporting (joint CSI report), a UE receives configuration information corresponding to both application of a channel measurement resource (CMR) for a plurality of transmission/reception points (multiple TRPs) and application of a CMR for a single TRP, and controls transmission of a CSI report on the basis of the configuration information. In the configuration information, CMR resources measured for the single TRP and CMR resources measured as a CSI pair for the multiple TRPs are configured independently (individually) (option 4-1). The UE may receive configuration information in which IMRs measured for the single TRP and IMRs (CSI-IM/NZP-IMRs) measured for the multiple TRPs are configured independently (individually), and may control transmission (generation) of a CSI report on the basis of the configuration information (option 4-2).

[Option 4-1]

When a joint CSI report corresponding to (or including) the most favorable CSI for the multiple TRPs and the most favorable CSI/second most favorable CSI from respective TRPs (two TRPs) for the single TRP is configured, CMR resources measured by the UE in a case of a single-TRP hypothesis may be configured independently of CMR resources measured by the UE as a CSI pair for a multi-TRP hypothesis.

In the CMR resource configuration, a sequence of CMRs for the single TRP and a sequence of CMRs for the multiple TRPs may be swapped with each other.

[Option 4-1-1]

CMRs (N beam pairs) for the multiple TRPs may be configured first, and CMRs (M CMRs per TRP) for the single TRP may be configured subsequently. M and N may be configured by, for example, higher layer signaling or the like.

Figure 24:
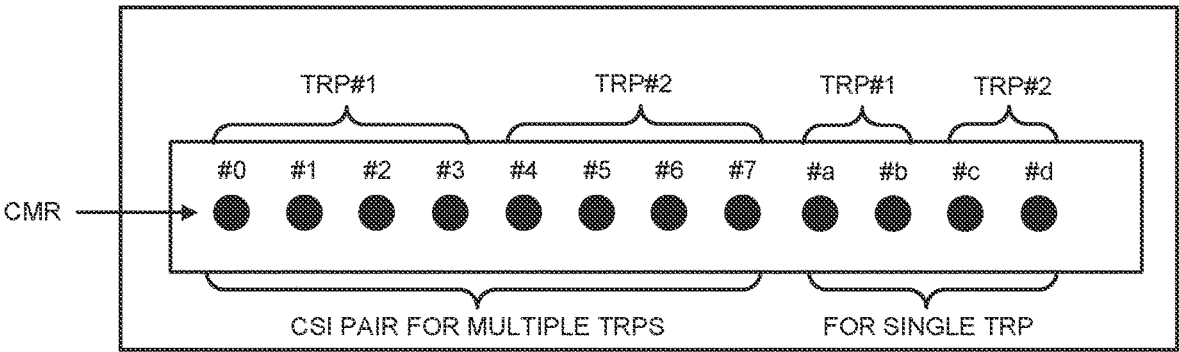
FIG. 24 is a diagram to show a first example of CMR configuration of option 4-1-1 in a fourth embodiment.

FIG. 24 is a diagram to show a first example of CMR configuration of option 4-1-1 in a fourth embodiment. As shown in FIG. 24, CMR #0 to CMR #3 correspond to TRP #1 (for the multiple TRPs), and CMR #4 to CMR #7 correspond to TRP #2 (for the multiple TRPs). As CSI pairs for the multiple TRPs, 4 or 16 CSI pairs described in any one of options of the first embodiment/the second embodiment may be configured. Subsequently, CMR #a and CMR #b corresponding to 2 beams (CSI) for TRP #1 (for the single TRP) are configured, and after that, CMR #c and CMR #d corresponding to 2 beams (CSI) for TRP #2 (for the single TRP) are configured.

Figure 25:
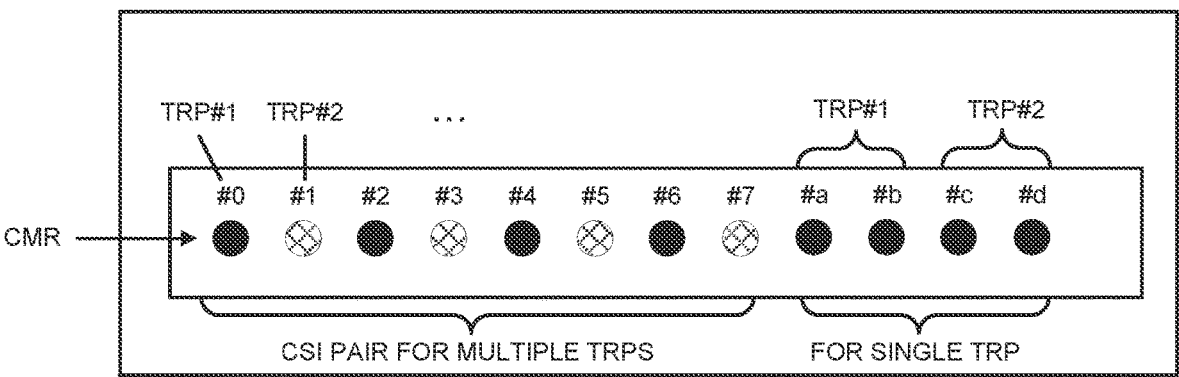
FIG. 25 is a diagram to show a second example of the CMR configuration of option 4-1-1 in the fourth embodiment.

FIG. 25 is a diagram to show a second example of the CMR configuration of option 4-1-1 in the fourth embodiment. As shown in FIG. 25, CMR #0, CMR #2, CMR #4, and CMR #6 correspond to TRP #1 (for the multiple TRPs), and CMR #1, CMR #3, CMR #5, and CMR #7 correspond to TRP #2 (for the multiple TRPs). A pair of CMR #0 and CMR #1, pair of CMR #2 and CMR #3, pair of CMR #4 and CMR #5, and pair of CMR #6 and CMR #7 may be configured as respective CSI pairs for the multiple TRPs. Subsequently, CMR #a and CMR #b corresponding to 2 beams (CSI) for TRP #1 (for the single TRP) are configured, and after that, CMR #c and CMR #d corresponding to 2 beams (CSI) for TRP #2 (for the single TRP) are configured.

[Option 4-1-2]

CMRs (M CMRs per TRP) for the single TRP may be configured first, and CMRs (N beam pairs) for the multiple TRPs may be configured subsequently. M and N may be configured by, for example, higher layer signaling or the like.

Figure 26:
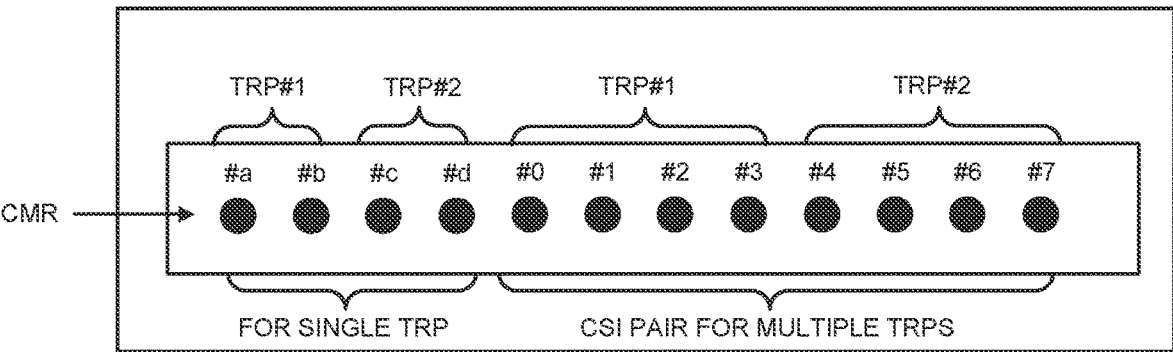
FIG. 26 is a diagram to show a first example of CMR configuration of option 4-1-2 in the fourth embodiment.

FIG. 26 is a diagram to show a first example of CMR configuration of option 4-1-2 in the fourth embodiment. FIG. 26 is the same as the example of FIG. 24 except that a sequence of CMR #0 to CMR #7 (for the multiple TRPs) and a sequence of CMR #a to CMR #d (for the single TRP) are swapped with each other, and detailed description of FIG. 26 will be omitted.

Figure 27:
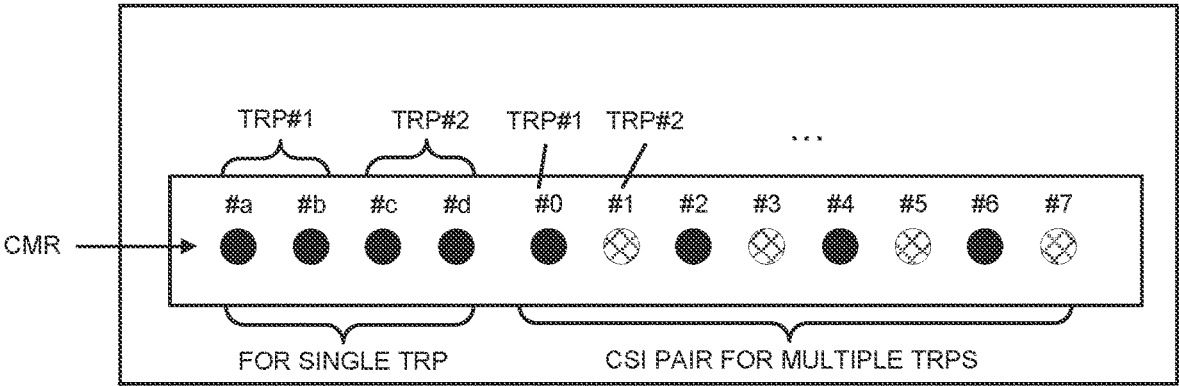
FIG. 27 is a diagram to show a second example of the CMR configuration of option 4-1-2 in the fourth embodiment.

FIG. 27 is a diagram to show a second example of the CMR configuration of option 4-1-2 in the fourth embodiment. FIG. 27 is the same as the example of FIG. 25 except that a sequence of CMR #0 to CMR #7 (for the multiple TRPs) and a sequence of CMR #a to CMR #d (for the single TRP) are swapped with each other, and detailed description of FIG. 27 will be omitted.

In CRI reporting, a sequence of CRI indexes of the single TRP and a sequence of CSI indexes of the multiple TRPs may be swapped with each other. For example, the CRI indexes may be configured as described in option 4-1-3 or option 4-1-4, or may be determined by specifications beforehand as described in these options.

[Option 4-1-3]

CRI k (k≥0) corresponds to the (k+1) th CSI pair. CRIs for TRP #1 start from 2N, and CRIs for TRP #2 start from 2N+M. N is the number of CMR resources for each TRP. In other words, CSI for the multiple TRPs may correspond to CRI indexes 0 to N−1, and CSI for the single TRP may correspond to CRI indexes 2N or more.

[Option 4-1-4]

CRI k (k≥0) corresponds to TRP #1 (single TRP), CRIs for TRP #2 (single TRP) start from M, and CRIs for the multiple TRPs start from 2M. In other words, CSI for the single TRP may correspond to CRI indexes 0 to M−1, and CSI for the multiple TRPs may correspond to CRI indexes 2M or more.

[Option 4-2]

IMR resources for a single-TRP hypothesis may be configured additionally, and may be TRP-specific resources. This IMR resources for the single-TRP hypothesis may be different from IMR resources for a multi-TRP hypothesis. A sequence of IMRs for the single TRP and a sequence of IMRs for the multiple TRPs may be swapped with each other. Note, however, that a sequence of the IMR resources is the same as a sequence of CMRs corresponding to the single TRP and the multiple TRPs. One-to-one mapping between a CMR and an IMR for the single-TRP hypothesis may be performed, for example, as described in the following option 4-2-1 or option 4-2-2.

[Option 4-2-1]

CSI-IM/NZP-IMR corresponding to the multiple TRPs may be configured first, and CSI-IM/NZP-IMR corresponding to the single TRP may be configured subsequently. The CSI-IM/NZP-IMR may be configured for TRP #1 first, and may be configured for TRP #2 subsequently.

Figure 28:
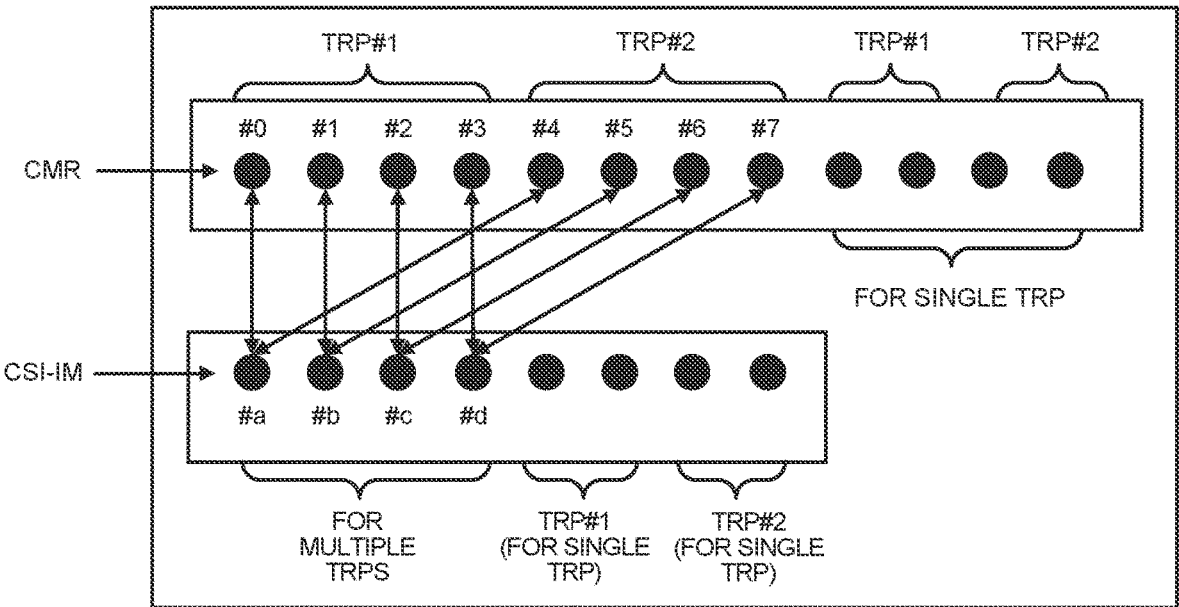
FIG. 28 is a diagram to show an example of CMR/CSI-IM configuration of option 4-2-1 in the fourth embodiment.

FIG. 28 is a diagram to show an example of CMR/CSI-IM configuration of option 4-2-1 in the fourth embodiment. FIG. 28 assumes option 1-1 of the first embodiment. Description of similarities to option 1-1 will be omitted. In FIG. 28, the CMR configuration is similar to that of FIG. 24. The CSI-IM configuration first performs configuration of CSI-IM corresponding to the multiple TRPs, and subsequently performs configuration in order of configuration of CSI-IM corresponding to TRP #1 (for the single TRP) and configuration of CSI-IM corresponding to TRP #2 (for the single TRP). Note that NZP-IMR configuration may also be similar to the CSI-IM configuration.

[Option 4-2-2]

CSI-IM/NZP-IMR corresponding to the single TRP may be configured first, and CSI-IM/NZP-IMR corresponding to the multiple TRPs may be configured subsequently. The CSI-IM/NZP-IMR may be configured for TRP #1 first, and may be configured for TRP #2 subsequently.

Figure 29:
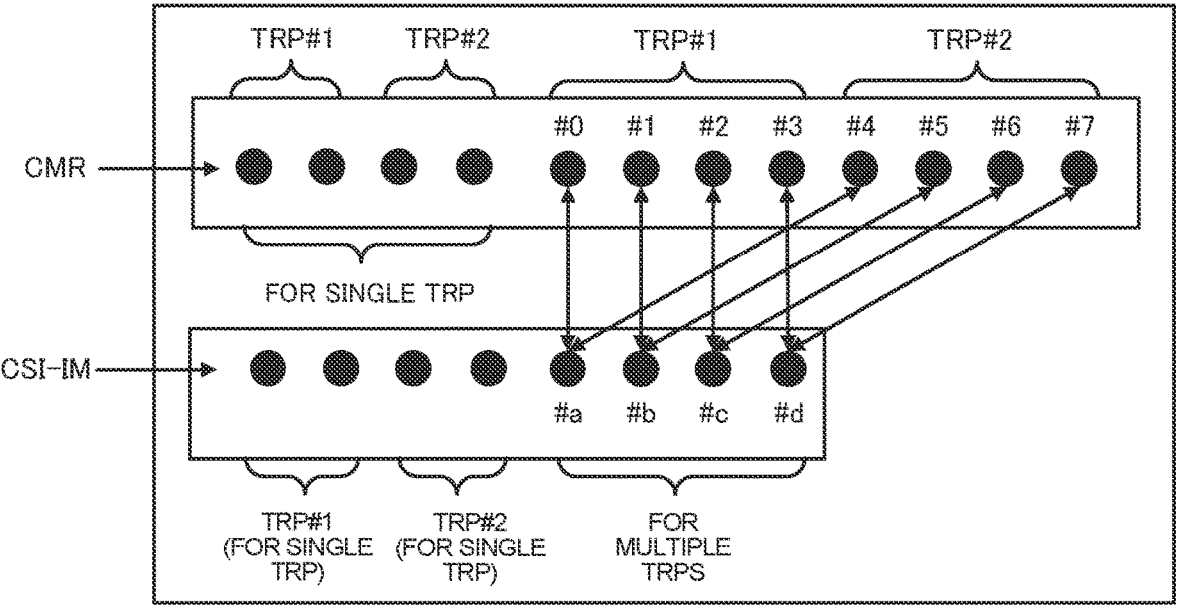
FIG. 29 is a diagram to show an example of CMR/CSI-IM configuration of option 4-2-2 in the fourth embodiment.

FIG. 29 is a diagram to show an example of CMR/CSI-IM configuration of option 4-2-2 in the fourth embodiment. FIG. 29 assumes option 1-1 of the first embodiment. Description of similarities to option 1-1 will be omitted. In FIG. 29, the CMR configuration is similar to that of FIG. 26. The CSI-IM configuration first performs configuration in order of configuration of CSI-IM corresponding to TRP #1 (for the single TRP) and configuration of CSI-IM corresponding to TRP #2 (for the single TRP), and subsequently performs configuration of CSI-IM corresponding to the multiple TRPs. Note that NZP-IMR configuration may also be similar to the CSI-IM configuration.

Option 4-2-1 and option 4-2-2 assume option 1-1 of the first embodiment, but may assume another option of the first embodiment and the second embodiment.

According to the fourth embodiment, a method for performing a joint between measurement/reporting in a multi-panel/TRP hypothesis and measurement/reporting in a single-panel/TRP hypothesis becomes definite.

Fifth Embodiment

When a joint CSI report corresponding to (or including) the most favorable CSI for the multiple TRPs and the most favorable CSI/second most favorable CSI from respective TRPs (two TRPs) for the single TRP is configured, CMR resources measured by the UE as the CSI pair for the multiple TRPs are measured by the UE for an individual single-TRP hypothesis (which may be referred to as a premise or an assumption).

For IMR resources, the UE may assume both a hypothesis for the multiple TRPs and a hypothesis for the single TRP. In other words, the IMR resources may be used for both measurement for the multiple TRPs and measurement for the single TRP in common. Independent CMR/IMR configuration for the single TRP and the multiple TRPs is not performed. Note, however, that a UE measurement operation for the single TRP is different from that for the multiple TRPs. In the present embodiment, the example of option 3-1 may be employed in CMR resource configuration and CRI reporting. In assumption of IMR measurement, the following option 5-1 and option 5-2 may be employed.

[Option 5-1]

The UE may assume that CSI-IM (ZP-IMR) means interference outside of both TRPs (interference from anything other than the both TRPs). This corresponds to interference for a multi-TRP hypothesis. When deriving CSI for the single TRP, the UE may recalculate interference from another TRP, and may use interference obtained by adding the recalculated interference to interference from anything other than the above-described both TRPs.

[Option 5-2]

The UE may assume that CSI-IM (ZP-IMR) associated with each TRP means interference outside of a corresponding TRP (interference from anything other than the corresponding TRP). This corresponds to interference for a single-TRP hypothesis. Next, when deriving CSI for the multiple TRPs, the UE may recalculate interference from another TRP, and may use interference obtained by subtracting the recalculated interference from interference from anything other than the above-described corresponding TRP.

Sixth Embodiment

A sixth embodiment relates to a constraint on a beam pair. The constraint on the beam pair described in the sixth embodiment (or a beam pair determination/selection/configuration method with consideration of this constraint) may be simply referred to as a beam pairing method. The beam pair of the present disclosure and a CMR pair may be interchangeably interpreted. The CMR pair may mean a CMR pair measured as a CSI pair for a plurality of TRPs.

With respect to such a beam pair as described above, the inventors of the present invention found that a case where a UE fails to measure the beam pair efficiently can occur depending on resource configuration in consideration of inter-beam (or TRP) interference.

In the present disclosure, it is assumed that the UE can perform, in FR 2, measurement by simultaneously using a plurality of receive beams. In this case, the UE may measure a signal by assuming that one receive beam is formed for each of at least one panel (in other words, one receive beam corresponds to at least one panel). Also, the UE may fail to measure a signal by assuming a plurality of receive beams for one panel. The UE that operates in FR 2 may have a certain number of (for example, 2) panels.

In the present disclosure, it is assumed that the UE can perform, in FR 1, measurement by simultaneously using up to one receive beam. The UE may have one receive beam, or may not have a receive beam.

Description will be described below under assumption that the above-mentioned assumption is employed in FR 1/2 of the present disclosure, but the present disclosure is not limited to this. FR 1/2 in description below may be interpreted as a case where the above-mentioned assumption is employed in a frequency band other than FR 1/2.

FIGS. 30A and 30B are each a diagram to show an example of a challenge of beam pair measurement. The present example describes the example by using, as an example, a case where CMRs (SSB IDs/CSI-RS resource IDs) #0 to #3 correspond to SSBs/NZP CSI-RSs from TRP #1, and CMRs #4 to #7 correspond to SSBs/NZP CSI-RSs from TRP #2, as described in FIG. 4.

FIG. 30A shows an example in which a time resource of CMR #0 and CMR #4 is time t0, a time resource of CMR #1 and CMR #5 is time t1, a time resource of CMR #2 and CMR #6 is time t2, and a time resource of CMR #3 and CMR #7 is time t3.

Assuming that FIG. 30A is configuration in FR 2, the UE can measure a beam pair of CMR #0 and CMR #4 (also simply described hereinafter as beam pair (0, 4)), beam pair (1, 5), beam pair (2, 6), and beam pair (3, 7) at t0, t1, t2, and t3, respectively. On the other hand, the UE fails to measure another beam pair (for example, beam pair (0, 5)).

Assuming that FIG. 30A is configuration in FR 1 for inter-TRP interference measurement, the UE fails to directly measure, for the inter-TRP interference measurement, a beam pair other than the above-mentioned four beam pairs (beam pairs (0, 4), (1, 5), (2, 6), and (3, 7)). On the other hand, the UE may recalculate each pair for inter-TRP interference in FR 1.

FIG. 30B shows an example in which a time resource of CMR #0, CMR #1, CMR #4, and CMR #5 is time t0, and a time resource of CMR #2, CMR #3, CMR #6, and CMR #7 is time t1.

Assuming that FIG. 30B is configuration in FR 2, the UE may measure, in accordance with the above-mentioned reception constraint, one beam pair (for example, beam pair (0, 4)) and one beam pair (for example, beam pair (2, 6)) at t0 and t1, respectively. On the other hand, the UE fails to measure another beam pair (for example, beam pair (0, 5)).

Assuming that FIG. 30B is configuration in FR 1 for inter-TRP interference measurement, the UE can measure, for the inter-TRP interference measurement, four beam pairs (beam pairs (0, 4), (0, 5), (1, 4), and (1, 5)) and four beam pairs (beam pairs (2, 6), (2, 7), (3, 6), and (3, 7)) at t0 and t1, respectively.

As described in FIGS. 30A and 30B, in FR 2, it may be assumed that the UE fails to measure, at a time when a beam pair to which a certain CMR belongs is measured, another beam pair to which the CMR belongs (by using a beam different from that for the above-described beam pair measurement). Also, in FR 1, it may be assumed that the UE can measure, at a time when a beam pair to which a certain CMR belongs is measured, another beam pair to which the CMR belongs.

As shown in FIG. 30A, there is a possibility that a plurality of CMRs from a certain TRP are TDMed, and as shown in FIG. 30B, there is a possibility that a plurality of CMRs from a certain TRP are TDMed/FDMed.

The inventors of the present invention came up with the idea of a beam pairing method for reducing a case where the UE fails to measure a beam pair efficiently (option 6-1 to option 6-3 below).

[Option 6-1]

Option 6-1 corresponds to a method for performing one-to-one beam pairing from two TRPs for at least one of group-based L1 beam reporting (for example, group-based L1-RSRP reporting) and CSI reporting. The one-to-one beam pairing method is employed in, for example, one-to-one N CSI pairs as shown in FIG. 4 to FIG. 5.

One or more constraints out of option 6-1-1 to option 6-1-3 below may be considered in CMR configuration. In other words, the UE may assume that one or more constraints out of option 6-1-1 to option 6-1-3 below are present.

A constraint in which one SSB/NZP-CSI-RS ID is configured (used) only in one beam pair (CMR pair) may be applied (option 6-1-1). In other words, when a certain CMR ID is configured in a certain beam pair, the UE does not expect that this CMR ID is configured in another beam pair.

Figure 31A:
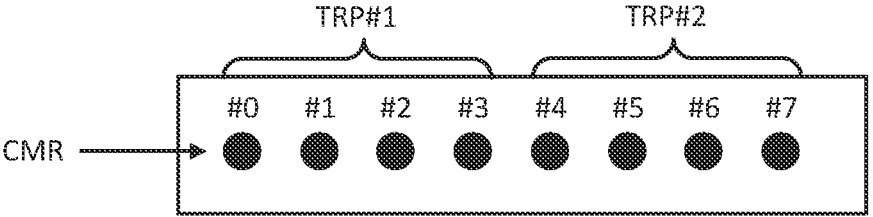
FIGS. 31A and 31B are each a diagram to show an example of CMR configuration of option 6-1-1 in a sixth embodiment.
Figure 31B:
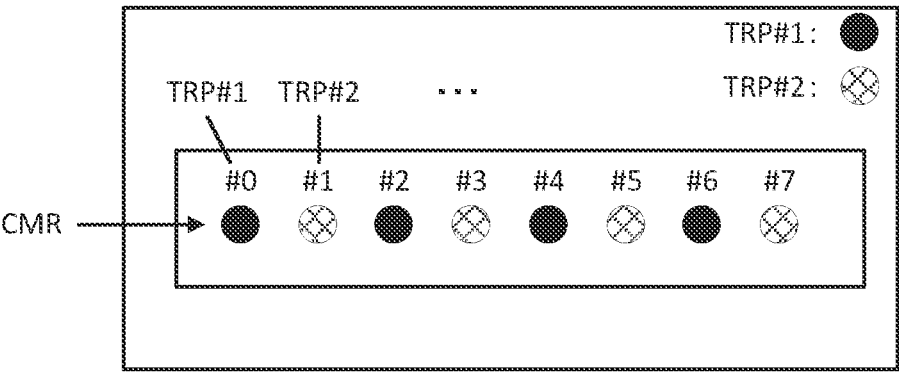

FIGS. 31A and 31B are each a diagram to show an example of CMR configuration of option 6-1-1 in the sixth embodiment.

FIG. 31A shows an example in which CMR #0 to CMR #3 correspond to SSBs/NZP CSI-RSs from TRP #1, and CMR #4 to CMR #7 correspond to SSBs/NZP CSI-RSs from TRP #2. In a case where N (for example, 4) beam pairs are configured for group-based beam reporting or MTRP CSI reporting, assuming that a first pair is CMR #0 and CMR #4, configuration not included in the other three pairs is performed for these CMR #0 and CMR #4.

FIG. 31B shows an example in which CMR #0, CMR #2, CMR #4, and CMR #6 correspond to SSBs/NZP CSI-RSs from TRP #1, and CMR #1, CMR #3, CMR #5, and CMR #7 correspond to SSBs/NZP CSI-RSs from TRP #2. In a case where N (for example, 4) beam pairs are configured for group-based beam reporting or MTRP CSI reporting, assuming that a first pair is CMR #0 and CMR #1, configuration not included in the other three pairs is performed for these CMR #0 and CMR #1.

A constraint in which one or a plurality of CMRs configured from one TRP (for one TRP) are TDMed at the same periodicity may be applied (option 6-1-2). In other words, with respect to one or a plurality of CMRs configured from one TRP, it may be assumed that information in which only offsets are different from each other and in which periodicities are the same is configured for configuration information about a periodicity and offset of a CSI-RS resource (for example, an RRC parameter "CSI-ResourcePeriodicityAndOffset").

A constraint in which, for two beams (CMRs) explicitly or implicitly configured in each beam pair, the two CMRs are configured with the same time behavior and the same time slot (for example, the same periodicity and the same offset) may be applied (option 6-1-3). Note that the time behavior may be at least one of periodic, semi-persistent, and aperiodic.

Note that the above-described constraints of option 6-1-1 and option 6-1-3 may be applied to only FR 2, may be applied to group-based L1-SINR measurement/CSI measurement for MTRP, or may be applied to a case where a corresponding UE capability is present. The above-described constraints of option 6-1-1 and option 6-1-3 may not be applied to L1-RSRP measurement in FR 1.

Note that the above-described constraint of option 6-1-2 may be applied to only FR 2, or may be applied to a case where a corresponding UE capability is present.

[Option 6-2]

Option 6-2 corresponds to a method for performing N×N beam pairing from two TRPs for at least one of group-based L1 beam reporting (for example, group-based L1-RSRP reporting) and CSI reporting. The N×N beam pairing method is employed in, for example, N×N CSI pairs as shown in FIG. 6 to FIG. 7.

One or more constraints described below may be considered in CMR configuration. In other words, the UE may assume that one or more constraints below are present.

A case that repetition is set to 'ON' for CMRs for group-based beam reporting/MTRP CSI reporting may be allowed. The case that the CMR repetition is set to 'ON' may be configured as, for example, repetition-related information with respect to an NZP CSI-RS resource set or NZP CSI-RS resources corresponding to the CMRs. The repetition-related information may indicate, for example, 'ON' or 'OFF.' Note that 'ON' may be represented as 'enabled (or valid),' and 'OFF' may be represented as 'disabled (or invalid).'

For example, for CMRs for which the repetition is set to 'ON,' the UE may assume that the CMRs at different times have been transmitted with use of the same downlink spatial domain transmission filter. In this case, the UE may assume that the CMRs have been transmitted with use of the same beam (for example, from the same TRP with use of the same beam).

For CMRs for which the repetition is set to 'OFF,' the UE may perform control in which the UE is not allowed to assume (or may not assume) that the CMRs at different times have been transmitted with use of the same downlink spatial domain transmission filter. In this case, the UE may assume that the CMRs are not transmitted with use of the same beam (have been transmitted with use of different beams). In other words, for the CMRs for which the repetition is set to 'OFF,' the UE may assume that a TRP is performing beam sweeping.

The number of CMR repetitions (the number of repetitive transmissions) may be determined by specifications beforehand, may be configured for the UE by higher layer signaling (for example, RRC signaling or a MAC CE), or may be determined on the basis of a UE capability. When the number of CMR repetitions is not configured explicitly, the UE may derive the number of the CMR repetitions on the basis of the number of configured or corresponding IMRs. The number of IMRs may correspond to the number of CMRs for another TRP.

Figure 32:
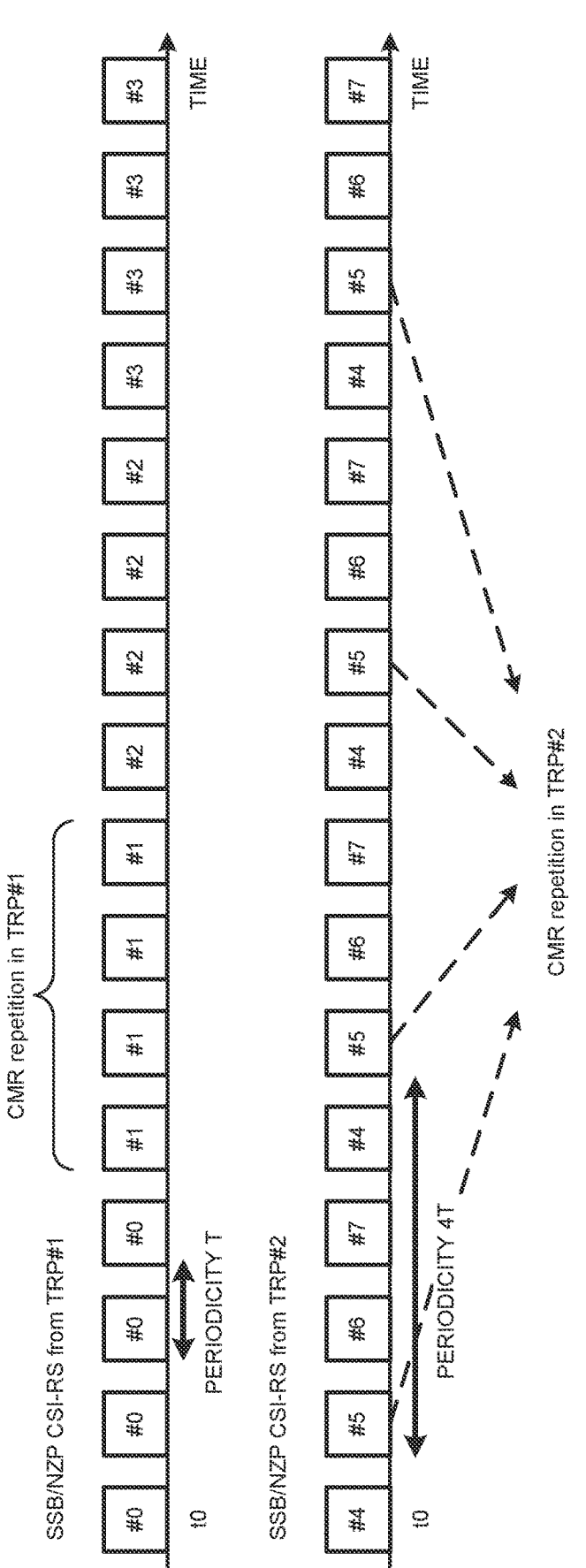
FIG. 32 is a diagram to show an example of CMR configuration of option 6-2 in the sixth embodiment.

FIG. 32 is a diagram to show an example of CMR configuration of option 6-2 in the sixth embodiment.

In the present example, for each of CMR #0 to CMR #3 corresponding to SSBs/NZP CSI-RSs from TRP #1, repetition with four times of repetitions is set to ON. Also, for each of CMR #4 to CMR #7 corresponding to SSBs/NZP CSI-RSs from TRP #2, repetition with four times of repetitions is set to ON.

The UE may assume that N×N (for example, N=4) beam pairs as shown in FIG. 32 are configured in FR 2 or in consideration of inter-beam interference. The UE can simultaneously measure CMRs (for example, CMR #0 and CMR #4) of a beam pair at the same time.

The present example is configured so that, in a period in which repetition of a CMR for TRP #1 is performed, repetition of another CMR for TRP #1 is absent. For example, CMR #0 is transmitted four times at periodicity T from time t0, and CMR #1 is transmitted four times at periodicity T from time t0+4T.

The present example is configured so that, in a repetition periodicity of a CMR for TRP #2, part of another CMR for TRP #2 is present. For example, CMR #4 is transmitted four times at periodicity 4T from time t0, and CMR #5 is transmitted four times at periodicity 4T from time t0+T.

For CMRs for which the repetition is set to 'ON,' configuration of a repetition periodicity/repetition start timing offset (also simply described hereinafter as repetition offset) may be supported. As shown in FIG. 32, the repetition periodicity/offset may vary for each TRP. Values of the repetition periodicity/offset may be determined by specifications beforehand (for example, a 2-symbol gap), may be configured for the UE by higher layer signaling (for example, RRC signaling or a MAC CE), or may be determined on the basis of a UE capability. The values of the repetition periodicity/offset may be defined/configured/determined differently for each subcarrier spacing.

Figure 33:
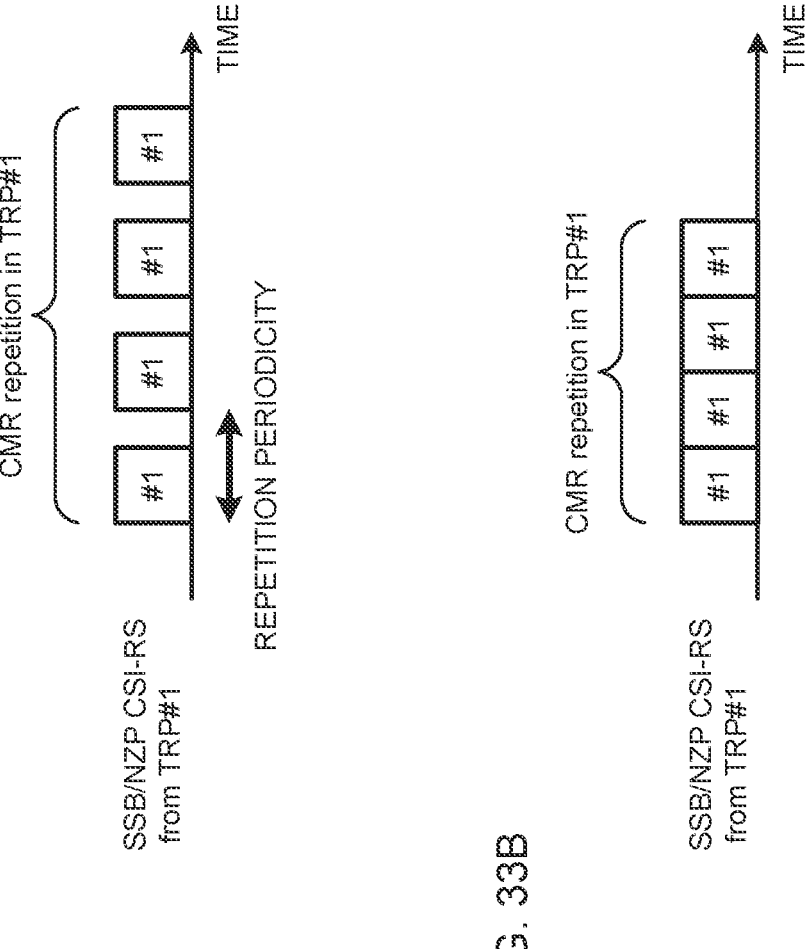
FIGS. 33A and 33B are each a diagram to show an example of CMR repetition of option 6-2 in the sixth embodiment.

FIGS. 33A and 33B are each a diagram to show an example of the CMR repetition of option 6-2 in the sixth embodiment. As shown in FIG. 33A, the repetition periodicity may have such a value with a gap between repetitions. The repetition periodicity may be longer than time allocated to the CMR for each repetition (for example, one or more symbols or one or more slots). The repetition periodicity may be represented by a gap from a final symbol of certain repetition to a start symbol of subsequent repetition, or may be represented by a gap (periodicity) from a start symbol of certain repetition to a start symbol of subsequent repetition.

As shown in FIG. 33B, the repetition periodicity may have such a value without a gap between repetitions (repetition is performed in continuous symbols). In this case, the repetition periodicity may be the same as time allocated to the CMR for each repetition, or may be configured as repetition periodicity=0. The UE may assume that, when a repetition periodicity of a CMR is not configured, repetition without a gap as shown in FIG. 33B is applied to the CMR.

A value of the repetition periodicity/offset of the CMR may be configured by configuration information about a periodicity and offset of a CSI-RS resource (for example, an RRC parameter "CSI-ResourcePeriodicityAndOffset"), or may be configured with use of another parameter.

Note that the above-described constraint of option 6-2 may be applied to only FR 2, may be applied to group-based L1-SINR measurement/CSI measurement for MTRP, or may be applied to a case where a corresponding UE capability is present. Also, the propriety of supporting configuration of the repetition periodicity/offset may depend on a UE capability. The UE may report, to a network, information about the above-described propriety of the support, information related to a repetition periodicity/offset value to be supported, and the like as UE capability information.

[Option 6-3]

Different beam pairing methods (beam pairing method of option 6-1 and beam pairing method of option 6-2) may be assumed by the UE in consideration of different measurement purpose configurations, or may be supported and configured by the network in consideration of different measurement purposes.

For example, the one-to-one beam pairing method of option 6-1 may be supported/assumed/employed/configured for only FR 2. The one-to-one beam pairing method of option 6-1 may be supported/assumed/employed/configured for group-based L1-SINR measurement/CSI measurement for MTRP.

For example, the N×N beam pairing method of option 6-2 may be supported/assumed/employed/configured for only FR 1. The one-to-one beam pairing method of option 6-1 may be supported/assumed/employed/configured for only group-based L1-RSRP measurement in FR 1.

Note that "group-based beam reporting" in the present disclosure and each of group-based beam measurement, group-based beam measurement/reporting, group-based L1 measurement/reporting, and the like may be interchangeably interpreted. "MTRP CSI reporting" in the present disclosure and each of MTRP CSI measurement, CSI measurement/ reporting for MTRP, and the like may be interchangeably interpreted. "Resources" in the present disclosure and each of a resource set, a resource group, and the like may be interchangeably interpreted.

<UE Capability>

The UE may transmit (report), to a base station, at least one of the following (1) to (11) as a UE capability (UE capability information).

(1) Whether to support, in CSI configuration, CMRs from different TRPs (2) Whether to support, in CSI configuration, CSI-IM resources (ZP-IMRs)/NZP-CSI-RS resources (NZP-IMRs) for interference measurement for different TRPs (3) Whether to support one or two CRIs for CSI pair having two pieces of CSI for MTRP NCJT CSI reporting (4) Whether to support, in periodic/semi-persistent/aperiodic CSI, interference measurement for one TRP based on CMR from another TRP (5) Whether to support, when UE measures interference on the basis of CMR, assumption of calculated precoding applied to CMR (6) Whether to support, in CSI reporting, reporting of both one piece of best CSI for single TRP and one piece of best CSI for multiple TRPs (7) Whether to support, in CSI reporting, reporting of two pieces of best CSI (one piece of CSI for each TRP) for single TRP and one piece of best CSI for multiple TRPs (8) Whether to support, in CSI reporting, reporting of two pieces of best CSI (one piece of CSI for each TRP) for single TRP (9) Whether to support, in CSI reporting, reporting of one piece of CSI (selected by UE) out of best CSI for single TRP and best CSI for multiple TRPs

(10) Whether to support independent/separate CMR resource configuration for single-TRP assumption and multi-TRP assumption

(11) Whether to support independent/separate IMR (CSI-IM/NZP-IM) resource configuration for single-TRP assumption and multi-TRP assumption (Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 34:
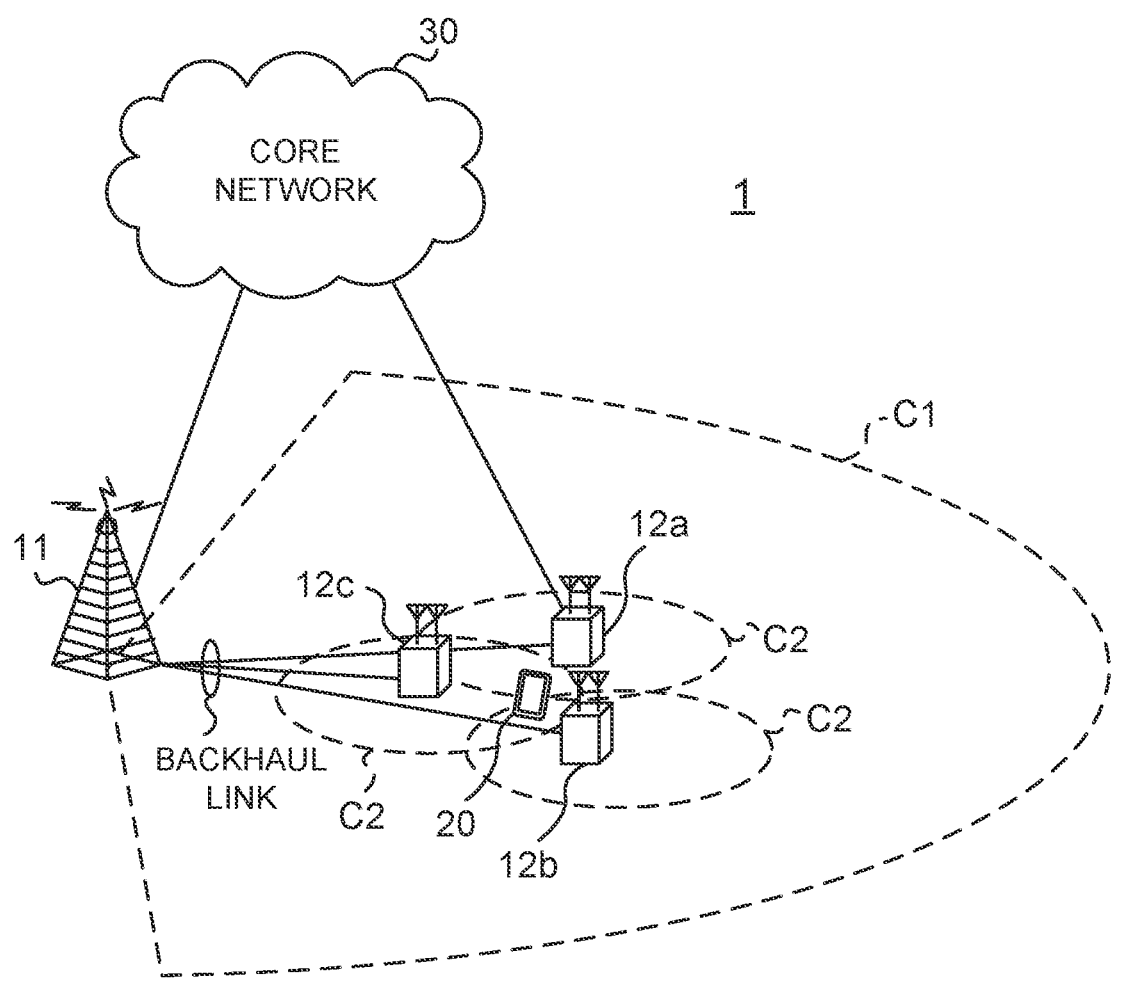
FIG. 34 is a diagram to show an example of a schematic structure of a radio communication system according to one embodiment.

FIG. 34 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system

1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 35:
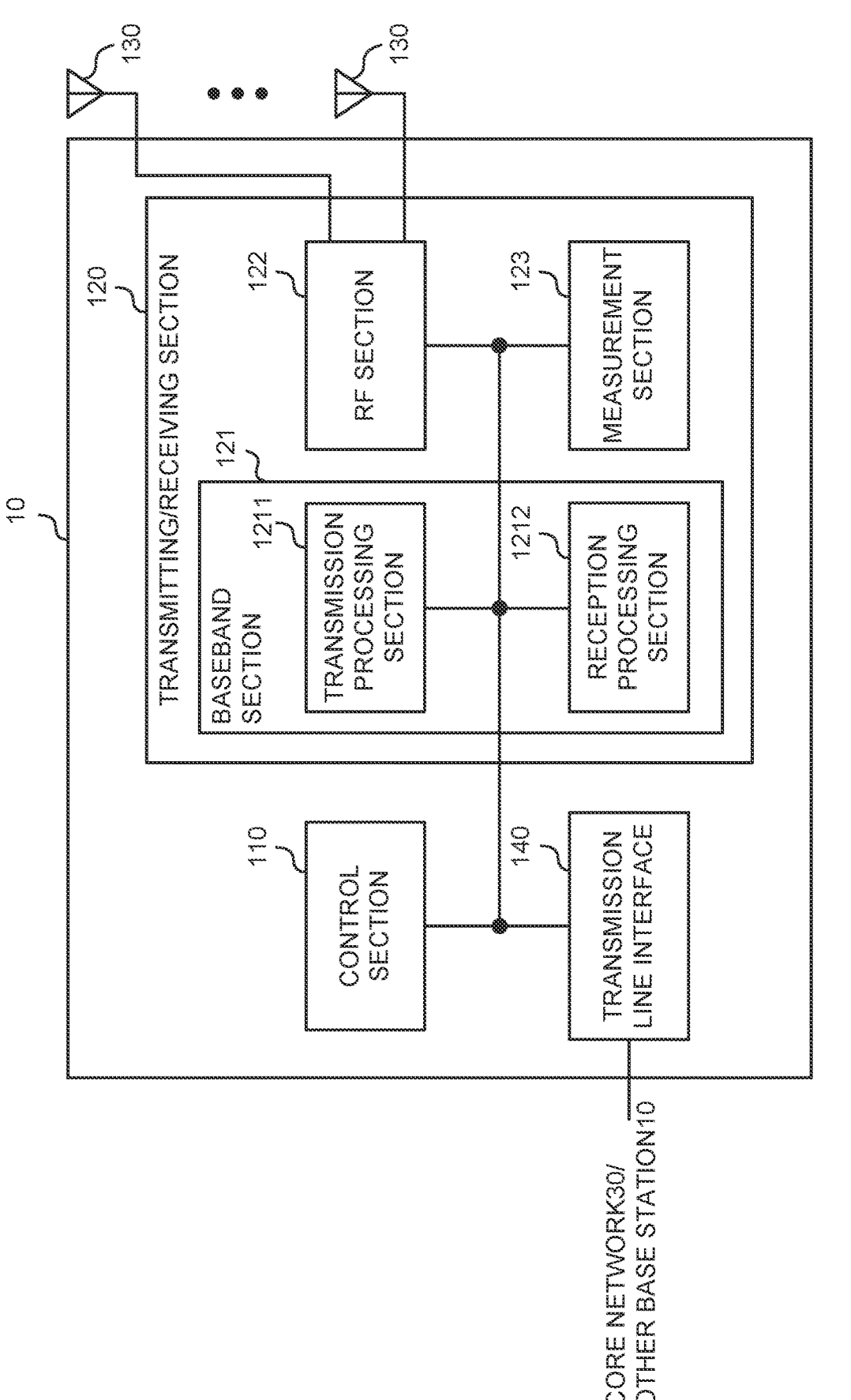
FIG. 35 is a diagram to show an example of a structure of a base station according to one embodiment.

FIG. 35 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may, when applying joint channel state information reporting, transmit configuration information corresponding to both application of a channel measurement resource for a plurality of transmission/reception points and application of a channel measurement resource for a single transmission/reception point, and may receive a channel state information report transmitted on the basis of the configuration information.

The transmitting/receiving section 120 may transmit configuration information related to one or a plurality of pairs of channel measurement resources. The transmitting/receiving section 120 may receive a group-based beam report or a channel state information report transmitted on the basis of the configuration information, the group-based beam report or the channel state information report being for a plurality of transmission/reception points.

Note that these pieces of configuration information may be, for example, an RRC IE "CSI-ReportConfig" (or IE included in this IE), or may be another RRC IE.

(User Terminal)

Figure 36:
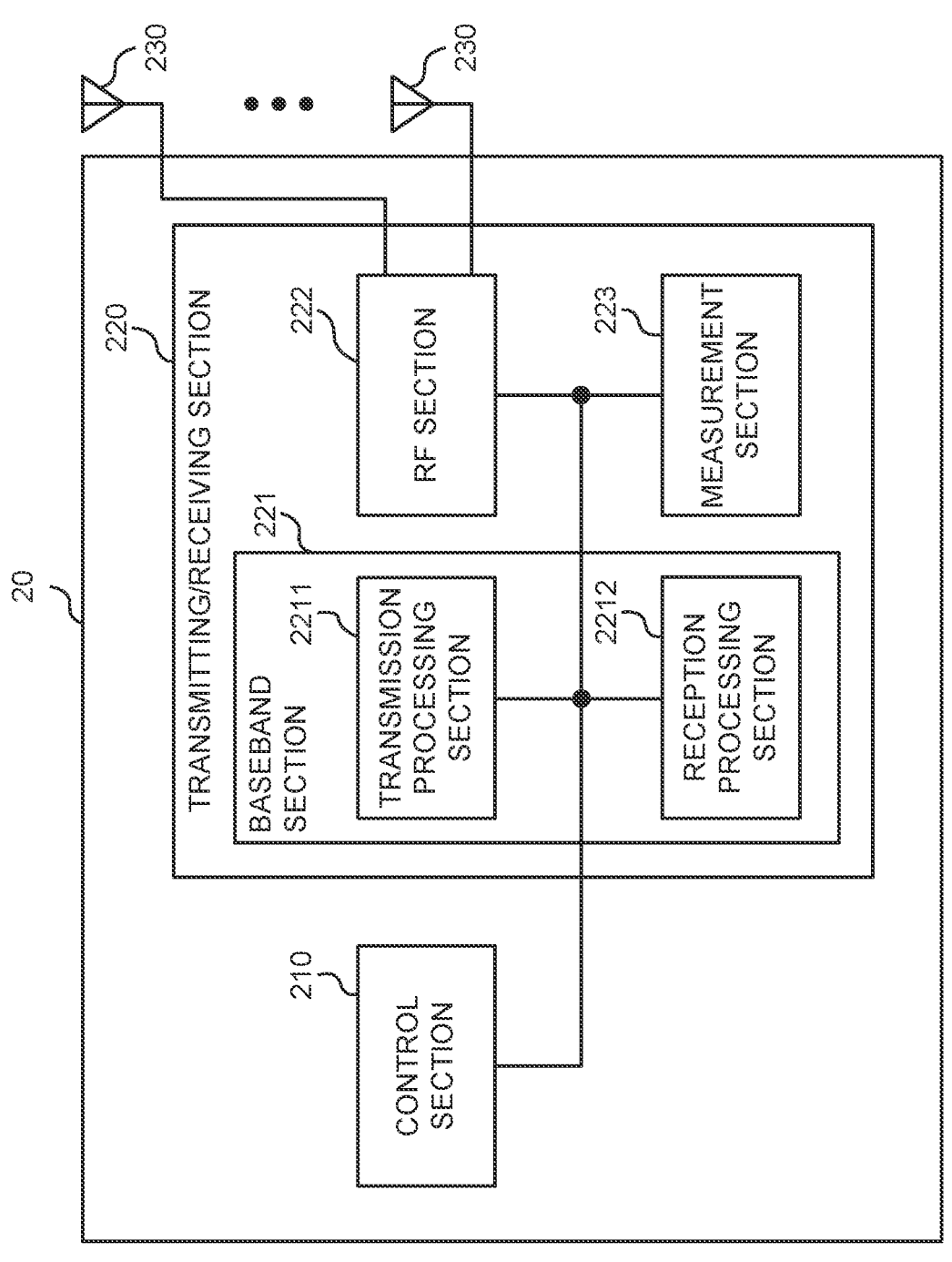
FIG. 36 is a diagram to show an example of a structure of a user terminal according to one embodiment.

FIG. 36 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine, on the basis of at least one of a first channel measurement resource corresponding to a first transmission/reception point and a second channel measurement resource corresponding to a second transmission/reception point, a first interference measurement resource corresponding to the first transmission/reception point or a second interference measurement resource corresponding to the second transmission/reception point. The control section 210 may, when a specific higher layer parameter is configured, determine the first interference measurement resource with non-zero power on the basis of the second channel measurement resource.

The transmitting/receiving section 220 may, when applying joint channel state information reporting, receive configuration information corresponding to both application of a channel measurement resource for a plurality of transmission/reception points and application of a channel measurement resource for a single transmission/reception point.

The control section 210 may control transmission of a channel state information report on the basis of the configuration information. The control section 210 may individually measure, for the single transmission/reception point, channel measurement resources measured as a channel state information pair for the plurality of transmission/reception points.

In the configuration information, channel measurement resources measured for the single transmission/reception point and channel measurement resources measured as a channel state information pair for the plurality of transmission/reception points may be configured independently.

In the configuration information, interference measurement resources measured for the single transmission/reception point and interference measurement resources measured as a channel state information pair for the plurality of transmission/reception points may be configured independently.

The transmitting/receiving section 220 may receive configuration information related to one or a plurality of pairs of channel measurement resources (CMRs) (CMR pairs). Note that the configuration information may be, for example, an RRC IE "CSI-ReportConfig" (or IE included in this IE), or may be another RRC IE.

The control section 210 may control, on the basis of the configuration information, group-based beam reporting or channel state information reporting (or measurement related to these) for a plurality of transmission/reception points.

The control section 210 may assume, for the plurality of pairs, that a channel measurement resource (ID) included in a certain pair (or constituting the certain pair) is not included in another pair.

The control section 210 may assume that repetition is configured for respective channel measurement resources included in the plurality of pairs.

The control section 210 may assume, for the plurality of pairs, that a repetition periodicity of one channel measurement resource included in a certain pair and a repetition periodicity of another channel measurement resource included in the certain pair are different from each other.
(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 37:
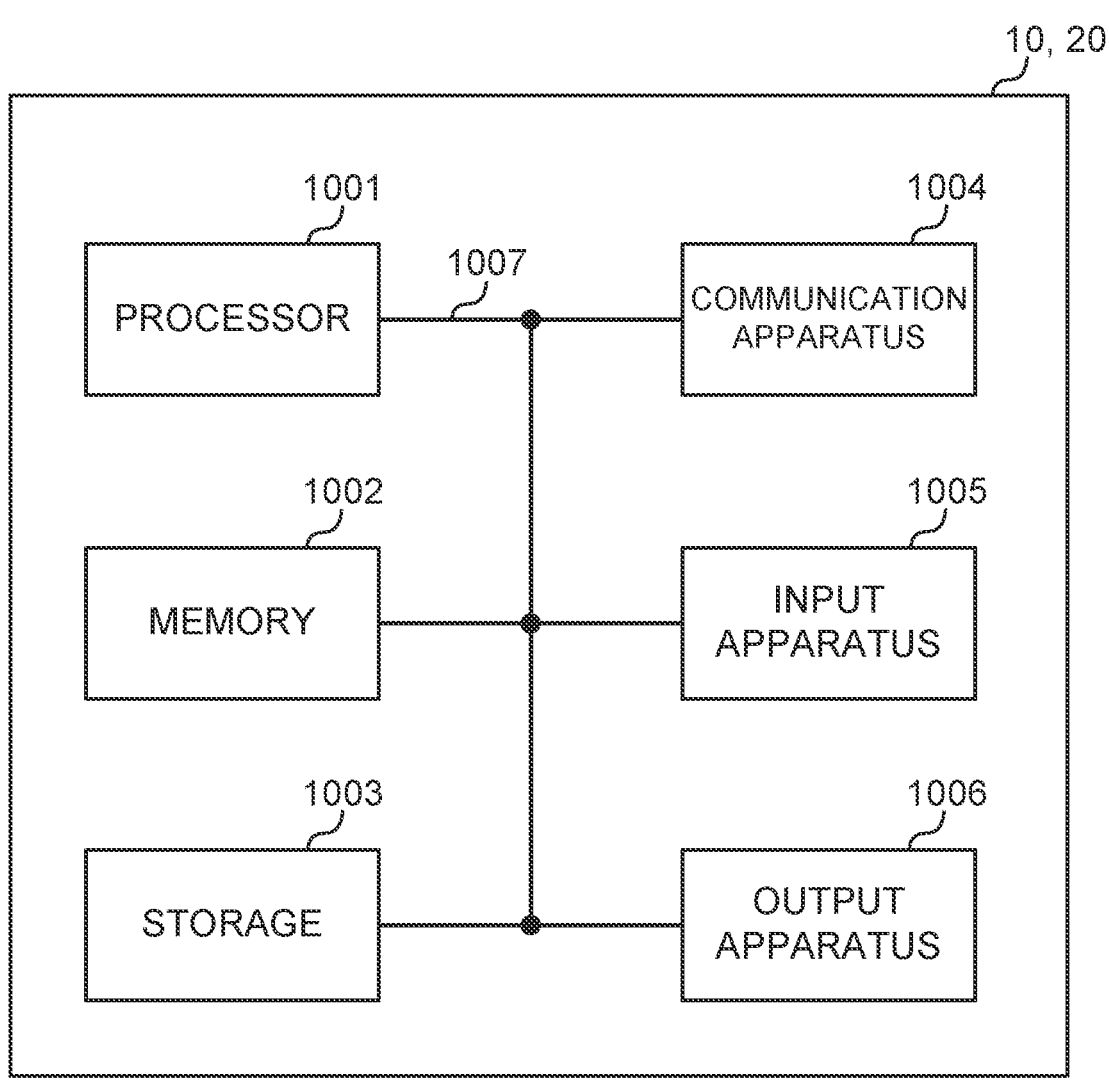
FIG. 37 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 37 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2021-13278 filed on Jan. 29, 2021. The entire contents of the application are incorporated herein.

What is claimed is:

1. A terminal comprising:
a processor that determines that a same channel measurement resource (CMR) can be included in multiple CMR pairs in a first frequency band, and determines that a same CMR is not included in the multiple CMR pairs in a second frequency band that is higher than the first frequency band; and a transmitter that transmits a channel state information (CSI) report regarding the multiple CMR pairs.

2. The terminal according to claim 1, wherein a repetition periodicity of two CMRs included in a certain pair differs among the multiple CMR pairs.

3. A radio communication method for a terminal, comprising:
determining that a same channel measurement resource (CMR) can be included in multiple CMR pairs in a first frequency band, and determining that a same CMR is not included in the multiple CMR pairs in a second frequency band that is higher than the first frequency band; and
transmitting a channel state information (CSI) report regarding the multiple CMR pairs.

4. A base station comprising:
a processor that configures, in a terminal, multiple channel measurement resource (CMR) pairs including a same CMR in a first frequency band, and configures, in the terminal, multiple CMR pairs not including a same CMR in a second frequency band that is higher than the first frequency band; and
a receiver that receives a channel state information (CSI) report regarding the multiple CMR pairs configured in the terminal.

5. A system comprising a terminal and a base station, wherein
the terminal comprises:
a processor that determines that a same channel measurement resource (CMR) can be included in multiple CMR pairs in a first frequency band, and determines that a same CMR is not included in the multiple CMR pairs in a second frequency band that is higher than the first frequency band; and
a transmitter that transmits a channel state information (CSI) report regarding the multiple CMR pairs, and
the base station comprises:
a receiver that receives the CSI report.

* * * * *